United States Patent
Shi et al.

(10) Patent No.: US 12,336,011 B2
(45) Date of Patent: Jun. 17, 2025

(54) COMMUNICATION METHOD AND APPARATUS

(71) Applicant: HUAWEI TECHNOLOGIES CO., LTD., Guangdong (CN)

(72) Inventors: Xiaoli Shi, Shanghai (CN); Chunhua You, Shanghai (CN); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 17/941,596

(22) Filed: Sep. 9, 2022

(65) Prior Publication Data

US 2023/0007694 A1 Jan. 5, 2023

Related U.S. Application Data

(63) Continuation of application No. PCT/CN2021/081089, filed on Mar. 16, 2021.

(30) Foreign Application Priority Data

Mar. 19, 2020 (CN) .......................... 202010198379.7

(51) Int. Cl.
*H04W 36/08* (2009.01)
*H04W 36/30* (2009.01)
*H04W 74/0808* (2024.01)

(52) U.S. Cl.
CPC ....... *H04W 74/0825* (2013.01); *H04W 36/08* (2013.01); *H04W 36/305* (2018.08)

(58) Field of Classification Search
CPC ............ H04W 74/0825; H04W 36/08; H04W 36/305; H04W 16/14; H04W 24/02;
(Continued)

(56) References Cited

U.S. PATENT DOCUMENTS 12,041,528 B2 * 7/2024 Park .................... H04W 36/305
2018/0020382 A1 1/2018 Kim et al.
(Continued)

FOREIGN PATENT DOCUMENTS

| CN | 107041000 A | 8/2017 |
| CN | 107371168 A | 11/2017 |
| WO | 2020033360 A1 | 2/2020 |

OTHER PUBLICATIONS

3GPP TS 36.331 V15.8.0 (Dec. 2019), "3rd Generation Partnership Project; Technical Specification Group Radio Access Network; Evolved Universal Terrestrial Radio Access (E-UTRA); Radio Resource Control (RRC); Protocol Specification (Release 15)," Dec. 2019, 964 pages.
(Continued)

*Primary Examiner* — Hanh N Nguyen
(74) *Attorney, Agent, or Firm* — Fish & Richardson P.C.

(57) ABSTRACT

This application provides a communication method and apparatus. In an example method, when a first access network device performs unsuccessful listen before talk (LBT) for channel detection on an unlicensed channel, the first access network device sends first indication information to a second access network device. The first indication information indicates that the first access network device performs unsuccessful LBT for channel detection on the unlicensed channel.

17 Claims, 15 Drawing Sheets

(58) Field of Classification Search
CPC ......... H04W 36/0078; H04W 74/0808; H04W 74/002; H04W 36/0058; H04W 36/0085; H04W 74/0833; H04W 36/0079
See application file for complete search history.

(56) References Cited

U.S. PATENT DOCUMENTS

| | | | |
|---|---|---|---|
| 2018/0124612 A1 | 5/2018 | Babaei et al. | |
| 2020/0221309 A1* | 7/2020 | Ozturk | H04L 25/0226 |
| 2021/0100031 A1* | 4/2021 | Cirik | H04W 76/19 |
| 2021/0227436 A1* | 7/2021 | Zhang | H04W 74/0833 |
| 2021/0352547 A1* | 11/2021 | Chang | H04W 76/27 |
| 2022/0304058 A1* | 9/2022 | Wang | H04W 74/0816 |

OTHER PUBLICATIONS

3GPP TR 37.816 V16.0.0 (Jul. 2019), "3rd Generation Partnership Project; Technical Specification Group Radio Access Network; Study on RAN-centric Data Collection and Utilization for LTE and NR (Release 16)," Jul. 2019, 35 pages.

CMCC, "Considerations on BWP Switching and Multi-activation for NR-U," 3GPP TSG-RAN WG2 Meeting #105, R2-1901944, Athens, Greece, Feb. 25-Mar. 1, 2019, 3 pages.

Huawei, HiSilicon, "RACH Procedure for NR-U," 3GPP TSG-RAN WG2 Meeting #105, R2-1901338, Athens, Greece, Feb. 25-Mar. 1, 2019, 3 pages.

ITRI, "Handling of Consistent UL LBT Failures during HO," 3GPP TSG-RAN WG2 Meeting #107bis, R2-1913064, Chongqing, China, Oct. 14-18, 2019, 2 pages.

PCT International Search Report and Written Opinion issued in International Application No. PCT/CN2021/081089 on Jun. 17, 2021, 15 pages (with English translation).

Qualcomm Inc., "Revised WID on NR-based Access to Unlicensed Spectrum," 3GPP TSG RAN Meeting #83, RP-190706, Shenzhen, China, Mar. 18-21, 2019, 8 pages.

Samsung, "On Indicating LBT Failure for NR-U," 3GPP TSG-RAN WG2 #105, R2-1901001, Athens, Greece, Feb. 25-Mar. 1, 2019, 1 page.

Spreadtrum Communications, "Mobility Consideration in NR-U," 3GPP TSG-RAN WG2 Meeting #107bis, R2-1912239, Chongqing, China, Oct. 14-18, 2019, 2 pages.

Extended European Search Report in European Appln No. 21770538.3, dated Jul. 12, 2023, 7 pages.

* cited by examiner

COMMUNICATION METHOD AND APPARATUS

CROSS-REFERENCE TO RELATED APPLICATIONS

This application is a continuation of International Application No. PCT/CN2021/081089, filed on Mar. 16, 2021, which claims priority to Chinese Patent Application No. 202010198379.7, filed on Mar. 19, 2020. The disclosures of the aforementioned applications are hereby incorporated by reference in their entireties.

TECHNICAL FIELD

This application relates to the communication field, and more particular, to a communication method and apparatus.

BACKGROUND

In a communication system, data transmission may be performed on unlicensed spectrums in the case of insufficient licensed spectrums for offloading for the licensed spectrums, obtaining better coverage and larger capacities, and achieving smoother user experience. On the unlicensed spectrums, a listen before talk (LBT) process needs to be followed, to avoid mutual interference between neighboring communication devices.

Currently, the wireless communication system supports inter-cell handover between unlicensed spectrum cells or between an unlicensed spectrum cell and a licensed spectrum cell. In this case, in a signaling and data transmission process, LBT needs to be performed on cells using the unlicensed spectrums. In an LBT execution process, unsuccessful LBT may occur, meaning that no suitable channel is found for data transmission.

However, in the case of a handover failure, an access network device can only determine, based on a radio link failure report, whether a handover is delayed or premature, or whether a wrong cell is handed over to, and cannot determine whether the handover failure is caused due to unsuccessful LBT. Therefore, in the case of using unlicensed spectrums, how to determine a cause for a handover failure is an urgent problem to be resolved.

SUMMARY

This application provides a communication method and apparatus, to identify a mobility problem arising from unsuccessful LBT, and distinguish it from a conventional mobility problem.

According to a first aspect, a communication method is provided. The method is performed by a first access network device or a component (for example, a chip or a circuit) that can be configured in the first terminal device. An example in which the method is performed by the first access network device is used below for description.

In the method, the first access network device receives a random access request sent by a terminal device, and then the first access network device performs unsuccessful listen before talk (LBT) for channel detection on an unlicensed channel. Subsequently, the first access network device sends first indication information to a second access network device, where the first indication information indicates that the first access network device performs unsuccessful LBT for channel detection on the unlicensed channel.

The method may be applied to a scenario in which the terminal device is handed over from the second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. When the UE fails to perform random access to the target gNB due to unsuccessful LBT performed by the target gNB for channel detection on an unlicensed channel, the target gNB may send, to the source gNB, indication information indicating unsuccessful LBT, so that the source gNB can perform cause analysis for the handover failure based on the indication information. Therefore, in this embodiment of this application, a mobility problem arising from unsuccessful LBT can be identified and distinguished from a conventional mobility problem, and further the mobility problem is resolved by adjusting a corresponding parameter.

In some embodiments, for example, the terminal device may be the UE, the second access network device may be the source gNB, and the first access network device may be the target gNB. After receiving a random access request (that is, an msg1) sent by the UE, the target gNB checks LBT on an unlicensed channel, and performs unsuccessful LBT for channel detection on the unlicensed channel. In this case, the unlicensed channel cannot be used by the target gNB to send the msg2 to the UE. In other words, the target gNB cannot obtain an unlicensed resource for sending the msg2. To be specific, the target gNB performs unsuccessful LBT when attempting to send, on the unlicensed channel, the msg2 to the UE, and consequently, the msg2 fails to be sent.

In some embodiments, for example, the terminal device may be the UE, the second access network device may be the source gNB, and the first access network device may be the target gNB. After receiving a random access request (that is, an msg1) sent by the UE, when checking LBT on an unlicensed channel and performing successful LBT for channel detection on the unlicensed channel, the target gNB may send an msg2 to the UE on the unlicensed channel. Subsequently, the target gNB receives an msg3 sent by the UE. In this case, the target gNB may check LBT on the unlicensed channel again, and perform unsuccessful LBT for channel detection on the unlicensed channel. In this case, the unlicensed channel cannot be used by the target gNB to send an msg4 to the UE. In other words, the target gNB cannot obtain an unlicensed resource for sending an msg4. To be specific, the target gNB performs unsuccessful LBT when attempting to send, on the unlicensed channel, the msg4 to the UE, and consequently, the msg4 fails to be sent.

With reference to the first aspect, in some implementations of the first aspect, before performing unsuccessful listen before talk (LBT) for channel detection on the unlicensed channel, the first access network device may further receive a handover request from the second access network device. The handover request requests the terminal device to hand over from the second access network device to the first access network device.

In response to the handover request, the first access network device sends a handover response to the second access network device and starts a timer corresponding to the terminal device, where the timer is used by the first access network device to identify the terminal device.

In this way, when sending a handover request acknowledgment, the first access network device starts the timer corresponding to the terminal device for handover. When the timer expires, the first access network device can determine that the terminal device fails in random access.

With reference to the first aspect, in some implementations of the first aspect, before the first access network device performs unsuccessful listen before talk (LBT) for channel detection on the unlicensed channel, the method further includes:

The first access network device receives fourth indication information from the second access network device, where the fourth indication information indicates the first access network device to start a timer corresponding to the terminal device, and the timer is used by the first access network device to identify the terminal device.

The first access network device starts the timer based on the fourth indication information.

In this way, the first access network device starts, based on the fourth indication information received from the second access network device, the timer corresponding to the terminal device for handover. When the timer expires, the first access network device can determine that the terminal device fails in random access.

With reference to the first aspect, in some implementations of the first aspect, the first indication information includes at least one of an identifier of the terminal device, an identifier of a cell on which unsuccessful LBT is performed, and a probability of unsuccessful LBT.

According to a second aspect, a communication method is provided. The method is performed by a second access network device or a component (for example, a chip or a circuit) that can be configured in the second access network device. An example in which the method is performed by the second access network device is used below for description.

In the method, the second access network device receives first indication information sent by a first access network device, where the first indication information indicates that the first access network device performs unsuccessful listen before talk (LBT) for channel detection on an unlicensed channel. Subsequently, the second access network device determines, based on the first indication information, a cause for a mobility problem arising from handover of a terminal device from the second access network device to the first access network device.

The method may be applied to a scenario in which the terminal device is handed over from the second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. When the UE fails to perform random access to the target gNB due to unsuccessful LBT performed by the target gNB for channel detection on an unlicensed channel, the target gNB may send, to the source gNB, indication information indicating unsuccessful LBT, so that the source gNB can perform cause analysis for the handover failure based on the indication information. Therefore, in this embodiment of this application, a mobility problem arising from unsuccessful LBT can be identified and distinguished from a conventional mobility problem, and further the mobility problem is resolved by adjusting a corresponding parameter.

With reference to the second aspect, in some implementations of the second aspect, before the second access network device receives the first indication information sent by the first access network device, the method further includes:

The second access network device sends fourth indication information to the first access network device, where the fourth indication information indicates the first access network device to start a timer corresponding to the terminal device, and the timer is used by the first access network device to identify the terminal device.

In this way, the fourth indication information is sent to the first access network device, to indicate the first access network device to start the timer corresponding to the terminal device for handover. When the timer expires, the first access network can determine that the terminal device fails in random access.

With reference to the second aspect, in some implementations of the second aspect, the first indication information includes at least one of an identifier of the terminal device, an identifier of a cell on which unsuccessful LBT is performed, and a probability of unsuccessful LBT.

According to a third aspect, a communication method is provided. The method is performed by a terminal device or a component (for example, a chip or a circuit) that can be configured in the terminal device. An example in which the method is performed by the terminal device is used below for description.

In the method, the terminal device performs unsuccessful listen before talk (LBT) for channel detection on a first unlicensed channel, and then performs successful LBT for channel detection on a second unlicensed channel. Subsequently, the terminal device sends, on the second unlicensed channel, a request message to a first access network device. The terminal device sends second indication information to the first access network device, where the second indication information indicates that the terminal device performs unsuccessful LBT for channel detection on the first unlicensed channel before performing channel detection on the second unlicensed channel and performing successful LBT.

The method may be applied to a scenario in which the terminal device is handed over from a second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. In a case that the UE performs unsuccessful LBT for channel detection on an unlicensed channel but finally performs successful LBT, a random access delay is large although the UE successfully performs random access to the target gNB. In this case, the UE may send, to the target gNB, indication information indicating unsuccessful LBT, so that the target gNB can perform cause analysis for a mobility problem based on the indication information. Therefore, in this embodiment of this application, the mobility problem arising from unsuccessful LBT can be identified and distinguished from a conventional mobility problem, and further the mobility problem is resolved by adjusting a corresponding parameter In some embodiments, for example, the terminal device may be the UE, the second access network device may be the source gNB, and the first access network device may be the target gNB. After receiving a handover command sent by the source gNB, the UE checks LBT on the first unlicensed channel, and performs unsuccessful LBT for channel detection on the first unlicensed channel. Subsequently, the UE continues to check LBT on the second unlicensed channel, and performs successful LBT for channel detection on the second unlicensed channel. In this case, the second unlicensed channel can be used by the UE to send a random access request (that is, an msg1) to the target gNB. In other words, the UE obtains, on the second unlicensed channel, the unlicensed resource for sending the random access request. Subsequently, the UE successfully sends, on the second unlicensed channel, the random access request to the target gNB.

In some embodiments, for example, the terminal device may be the UE, the second access network device may be the source gNB, and the first access network device may be the target gNB. After receiving an msg2 sent by the target gNB, the UE may check LBT on a first unlicensed channel, and performs unsuccessful LBT for channel detection on the first unlicensed channel. Subsequently, the UE continues to check LBT on the second unlicensed channel, and performs successful LBT for channel detection on the second unlicensed channel. In this case, the second unlicensed channel can be used by the UE to send an msg3 to the target gNB. In other words, the UE obtains, on the second unlicensed channel, the unlicensed resource for sending the msg3. Subsequently, the UE successfully sends, on the second unlicensed channel, the msg3 to the target gNB.

It should be noted that, in a case that the UE has performed unsuccessful LBT for channel detection on the unlicensed channel but finally performs successful LBT on the unlicensed channel, a delay in the random access procedure is increased although a random access procedure between the UE and the target gNB is successful, resulting in a mobility problem.

With reference to the third aspect, in some implementations of the third aspect, that the terminal device sends the second indication information to the first access network device includes.

The terminal device sends a successful handover report to the first access network device, where the successful handover report indicates that the terminal device is successfully handed over to the first access network device, and the successful handover report includes the second indication information.

In this way, the second indication information may be sent to the first access network device via the existing successful handover report that includes the second indication information.

With reference to the third aspect, in some implementations of the third aspect, the successful handover report further includes at least one of the following:

a period of time from a moment at which the terminal device starts to perform channel detection on the first unlicensed channel to a moment at which the terminal device performs successful LBT on the second unlicensed channel;

information about a moment at which the terminal device performs unsuccessful LBT on the first unlicensed channel;

a period of time from a moment at which the terminal device receives a handover command to a moment at which the terminal device starts to check LBT on the first unlicensed channel;

a period of time from a moment at which the terminal device receives a handover command to a moment at which the terminal device performs unsuccessful LBT on the first unlicensed channel;

a period of time from a moment at which the terminal device starts to check LBT on the first unlicensed channel to a moment at which the terminal device performs unsuccessful LBT;

a period of time from a moment at which the terminal device performs unsuccessful LBT to a moment at which the terminal device performs successful LBT;

a quantity of times of performing unsuccessful LBT during a period of time from a moment at which the terminal device starts to perform channel detection on the first unlicensed channel to a moment at which the terminal device performs successful LBT on the second unlicensed channel; and channel occupation information.

With reference to the third aspect, in some implementations of the third aspect, the second indication information includes at least one of an identifier of the terminal device, an identifier of a cell on which unsuccessful LBT is performed, and a probability of unsuccessful LBT.

According to a fourth aspect, a communication method is provided. The method is performed by a first access network device or a component (for example, a chip or a circuit) that can be configured in the first access network device. An example in which the method is performed by the first access network device is used below for description.

In the method, the first access network device receives a request message sent on a second unlicensed channel by a terminal device. Subsequently, the first access network device receives second indication information sent by the terminal device, where the second indication information indicates that the terminal device performs unsuccessful listen before talk (LBT) for channel detection on a first unlicensed channel before performing channel detection on the second unlicensed channel and performing successful LBT. Then, the first access network device determines, based on the second indication information, a cause for a mobility problem arising from handover of the terminal device from a second access network device to the first access network device.

The method may be applied to a scenario in which the terminal device is handed over from the second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. In a case that the UE performs unsuccessful LBT for channel detection on an unlicensed channel but finally performs successful LBT, a random access delay is large although the UE successfully performs random access to the target gNB. In this case, the UE may send, to the target gNB, indication information indicating unsuccessful LBT, so that the target gNB can perform cause analysis for a mobility problem based on the indication information. Therefore, in this embodiment of this application, the mobility problem arising from unsuccessful LBT can be identified and distinguished from a conventional mobility problem, and further the mobility problem is resolved by adjusting a corresponding parameter.

With reference to the fourth aspect, in some implementations of the fourth aspect, that the first access network device receives the second indication information sent by the terminal device includes.

The first access network device receives a successful handover report sent by the terminal device, where the successful handover report indicates that the terminal device is successfully handed over to the first access network device, and the successful handover report includes the second indication information.

In this way, the second indication information may be sent to the first access network device via the existing successful handover report that includes the second indication information.

With reference to the fourth aspect, in some implementations of the fourth aspect, the successful handover report further includes at least one of the following:
- a period of time from a moment at which the terminal device starts to perform channel detection on the first unlicensed channel to a moment at which the terminal device performs successful LBT on the second unlicensed channel;
- information about a moment at which the terminal device performs unsuccessful LBT on the first unlicensed channel;
- a period of time from a moment at which the terminal device receives a handover command to a moment at which the terminal device starts to check LBT on the first unlicensed channel;
- a period of time from a moment at which the terminal device receives a handover command to a moment at which the terminal device performs unsuccessful LBT on the first unlicensed channel;
- a period of time from a moment at which the terminal device starts to check LBT on the first unlicensed channel to a moment at which the terminal device performs unsuccessful LBT;
- a period of time from a moment at which the terminal device performs unsuccessful LBT to a moment at which the terminal device performs successful LBT;
- a quantity of times of performing unsuccessful LBT during a period of time from a moment at which the terminal device starts to perform channel detection on the first unlicensed channel to a moment at which the terminal device performs successful LBT on the second unlicensed channel; and
- channel occupation information.

With reference to the fourth aspect, in some implementations of the fourth aspect, the second indication information includes at least one of an identifier of the terminal device, an identifier of a cell on which unsuccessful LBT is performed, and a probability of unsuccessful LBT.

According to a fifth aspect, a communication method is provided. The method is performed by a second access network device or a component (for example, a chip or a circuit) that can be configured in the second access network device. An example in which the method is performed by the second access network device is used below for description.

In the method, the second access network device performs unsuccessful listen before talk (LBT) for channel detection on a first unlicensed channel, and then performs successful LBT for channel detection on a second unlicensed channel. Subsequently, the second access network device sends, on the second unlicensed channel, a handover command to a terminal device. Then, the second access network device sends third indication information to a first access network device, where the third indication information indicates that the terminal device performs unsuccessful LBT for channel detection on the first unlicensed channel before performing channel detection on the second unlicensed channel and performing successful LBT.

The method may be applied to a scenario in which the terminal device is handed over from the second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. In a case that the source gNB performs unsuccessful LBT for channel detection on an unlicensed channel but finally performs successful LBT, a delay in a handover process is large although the source gNB successfully sends a handover command. In this case, the source gNB may send, to the target gNB, indication information indicating unsuccessful LBT, for cause analysis for a mobility problem. Therefore, in this embodiment of this application, the mobility problem arising from unsuccessful LBT can be identified and distinguished from a conventional mobility problem, and further the mobility problem is resolved by adjusting a corresponding parameter.

In some embodiments, for example, the terminal device may be the UE, the second access network device may be the source gNB, and the first access network device may be the target gNB. After receiving a handover request acknowledgment sent by the target gNB, the source gNB checks LBT on the first unlicensed channel, and performs unsuccessful LBT for channel detection on the first unlicensed channel. Subsequently, the source gNB continues to check LBT on the second unlicensed channel, and performs successful LBT for channel detection on the second unlicensed channel. In this case, the second unlicensed channel can be used by the source gNB to send the handover command to the UE. In other words, the source gNB obtains the unlicensed resource for sending the handover command to the UE.

With reference to the fifth aspect, in some implementations of the fifth aspect, the third indication information includes:
- a period of time from a moment at which the second access network device starts to perform channel detection on the first unlicensed channel to a moment at which the second access network device performs successful LBT on the second unlicensed channel;
- information about a moment at which the second access network device performs unsuccessful LBT on the first unlicensed channel;
- a period of time from a moment at which the second access network device starts to check LBT on the first unlicensed channel to a moment at which the second access network device performs unsuccessful LBT;
- a period of time from a moment at which the second access network device performs unsuccessful LBT to a moment at which the second access network device successfully sends a handover command;
- a quantity of times of performing unsuccessful LBT during a period of time from a moment at which the second access network device starts to perform channel detection on the first unlicensed channel to a moment at which the second access network device performs successful LBT on the second unlicensed channel; and
- channel occupation information.

With reference to the fifth aspect, in some implementations of the fifth aspect, the third indication information includes at least one of an identifier of the terminal device, an identifier of a cell on which unsuccessful LBT is performed, and a probability of unsuccessful LBT.

According to a sixth aspect, a communication method is provided. The method is performed by a first access network device or a component (for example, a chip or a circuit) that can be configured in the first access network device. An example in which the method is performed by the first access network device is used below for description.

In the method, the first access network device receives third indication information from a second access network device, where the third indication information indicates that a terminal device performs unsuccessful listen before talk (LBT) for channel detection on a first unlicensed channel before performing channel detection on a second unlicensed channel and performing successful LBT. Subsequently, the first access network device determines, based on the third indication information, a cause for a mobility problem arising from handover of the terminal device from the second access network device to the first access network device.

The method may be applied to a scenario in which the terminal device is handed over from the second access network device to the first access network device. For example, the terminal device may be UE, the second access network device may be a source gNB, and the first access network device may be a target gNB.

For example, the terminal device may be the UE, the second access network device may be the source gNB, and the first access network device may be the target gNB. In a case that the source gNB performs unsuccessful LBT for channel detection on an unlicensed channel but finally performs successful LBT, a delay in a handover process is large although the source gNB successfully sends a handover command. In this case, the source gNB may send, to the target gNB, indication information indicating unsuccessful LBT, for cause analysis for a mobility problem. Therefore, in this embodiment of this application, the mobility problem arising from unsuccessful LBT can be identified and distinguished from a conventional mobility problem, and further the mobility problem is resolved by adjusting a corresponding parameter.

With reference to the sixth aspect, in some implementations of the sixth aspect, the third indication information includes:
  a period of time from a moment at which the second access network device starts to perform channel detection on the first unlicensed channel to a moment at which the second access network device performs successful LBT on the second unlicensed channel;
  information about a moment at which the second access network device performs unsuccessful LBT on the first unlicensed channel;
  a period of time from a moment at which the second access network device starts to check LBT on the first unlicensed channel to a moment at which the second access network device performs unsuccessful LBT;
  a period of time from a moment at which the second access network device performs unsuccessful LBT to a moment at which the second access network device successfully sends a handover command;
  a quantity of times of performing unsuccessful LBT during a period of time from a moment at which the second access network device starts to perform channel detection on the first unlicensed channel to a moment at which the second access network device performs successful LBT on the second unlicensed channel; and
  channel occupation information.

With reference to the sixth aspect, in some implementations of the sixth aspect, the third indication information includes at least one of an identifier of the terminal device, an identifier of a cell on which unsuccessful LBT is performed, and a probability of unsuccessful LBT.

According to a seventh aspect, an embodiment of this application provides a communication apparatus, configured to perform the method in the first aspect or any possible implementation of the first aspect. Specifically, the apparatus includes units or modules configured to perform the method in the first aspect or any possible implementation of the first aspect, for example, a transceiver unit and a processing unit.

The transceiver unit is configured to receive a random access request sent by a terminal device.

The processing unit is configured to perform unsuccessful listen before talk (LBT) for channel detection on an unlicensed channel.

The transceiver unit is further configured to send first indication information to a second access network device, where the first indication information indicates that a first access network device performs unsuccessful LBT for channel detection on the unlicensed channel.

Optionally, before the processing unit performs unsuccessful listen before talk (LBT) for channel detection on the unlicensed channel, the transceiver unit is further configured to receive a handover request from the second access network device, where the handover request requests the terminal device to hand over from the second access network device to the first access network device.

In response to the handover request, the transceiver unit is further configured to send a handover response to the second access network device, and the processing unit is further configured to start a timer corresponding to the terminal device, where the timer is used by the first access network device to identify the terminal device.

Optionally, before the processing unit performs unsuccessful listen before talk (LBT) for channel detection on the unlicensed channel, the transceiver unit is further configured to receive fourth indication information from the second access network device, where the fourth indication information indicates the first access network device to start the timer corresponding to the terminal device, and the timer is used by the first access network device to identify the terminal device.

The processing unit is further configured to start the timer based on the fourth indication information.

Optionally, the first indication information includes at least one of an identifier of the terminal device, an identifier of a cell on which unsuccessful LBT is performed, and a probability of unsuccessful LBT.

According to an eighth aspect, an embodiment of this application provides a communication apparatus, configured to perform the method in the second aspect or any possible implementation of the second aspect. Specifically, the apparatus includes units or modules configured to perform the method in the second aspect or any possible implementation of the second aspect, for example, a transceiver unit and a processing unit.

The transceiver unit is configured to receive first indication information sent by a first access network device, where the first indication information indicates that the first access network device performs unsuccessful listen before talk (LBT) for channel detection on an unlicensed channel.

The processing unit is configured to determine, based on the first indication information, a cause for a mobility problem arising from handover of a terminal device from a second access network device to the first access network device.

Optionally, before receiving the first indication information sent by the first access network device, the transceiver unit is further configured to send fourth indication information to the first access network device, where the fourth indication information indicates the first access network device to start a timer corresponding to the terminal device, and the timer is used by the first access network device to identify the terminal device.

Optionally, the first indication information includes at least one of an identifier of the terminal device, an identifier of a cell on which unsuccessful LBT is performed, and a probability of unsuccessful LBT.

According to a ninth aspect, an embodiment of this application provides a communication apparatus, configured to perform the method in the third aspect or any possible implementation of the third aspect. Specifically, the apparatus includes units or modules configured to perform the method in the third aspect or any possible implementation of the third aspect, for example, a transceiver unit and a processing unit.

The processing unit is configured to perform unsuccessful listen before talk (LBT) for channel detection on a first unlicensed channel, and perform successful LBT for channel detection on a second unlicensed channel.

The transceiver unit is configured to send, on the second unlicensed channel, a request message to a first access network device.

The transceiver unit is further configured to send second indication information to the first access network device, where the second indication information indicates that a terminal device performs unsuccessful LBT for channel detection on the first unlicensed channel before performing channel detection on the second unlicensed channel and performing successful LBT.

Optionally, the transceiver unit is specifically configured to send a successful handover report to the first access network device, where the successful handover report indicates that the terminal device is successfully handed over to the first access network device, and the successful handover report includes the second indication information.

Optionally, the successful handover report further includes at least one of the following:
  a period of time from a moment at which channel detection starts to be performed on the first unlicensed channel to a moment at which successful LBT is performed on the second unlicensed channel;
  information about a moment at which unsuccessful LBT is performed on the first unlicensed channel;
  a period of time from a moment at which a handover command is received to a moment at which LBT starts to be checked on the first unlicensed channel;
  a period of time from a moment at which a handover command is received to a moment at which unsuccessful LBT is performed on the first unlicensed channel;
  a period of time from a moment at which LBT starts to be checked on the first unlicensed channel to a moment at which unsuccessful LBT is performed;
  a period of time from a moment at which unsuccessful LBT is performed to a moment at which successful LBT is performed;
  a quantity of times of performing unsuccessful LBT during a period of time from a moment at which channel detection starts to be performed on the first unlicensed channel to a moment at which successful LBT is performed on the second unlicensed channel; and
  channel occupation information.

Optionally, the second indication information includes at least one of an identifier of the terminal device, an identifier of a cell on which unsuccessful LBT is performed, and a probability of unsuccessful LBT.

Optionally, the request message includes a message 1 or a message 3 in a random access procedure.

According to a tenth aspect, an embodiment of this application provides a communication apparatus, configured to perform the method in the fourth aspect or any possible implementation of the fourth aspect. Specifically, the apparatus includes units or modules configured to perform the method in the fourth aspect or any possible implementation of the fourth aspect, for example, a transceiver unit and a processing unit.

The transceiver unit is configured to receive a request message sent on a second unlicensed channel by a terminal device.

The transceiver unit is further configured to receive second indication information sent by the terminal device, where the second indication information indicates that the terminal device performs unsuccessful listen before talk (LBT) for channel detection on a first unlicensed channel before performing channel detection on the second unlicensed channel and performing successful LBT.

The processing unit is configured to determine, based on the second indication information, a cause for a mobility problem arising from handover of the terminal device from a second access network device to the first access network device.

Optionally, the transceiver unit is specifically configured to receive a successful handover report sent by the terminal device, where the successful handover report indicates that the terminal device is successfully handed over to the first access network device, and the successful handover report includes the second indication information.

Optionally, the successful handover report further includes at least one of the following:
  a period of time from a moment at which the terminal device starts to perform channel detection on the first unlicensed channel to a moment at which the terminal device performs successful LBT on the second unlicensed channel;
  information about a moment at which the terminal device performs unsuccessful LBT on the first unlicensed channel;
  a period of time from a moment at which the terminal device receives a handover command to a moment at which the terminal device starts to check LBT on the first unlicensed channel;
  a period of time from a moment at which the terminal device receives a handover command to a moment at which the terminal device performs unsuccessful LBT on the first unlicensed channel;
  a period of time from a moment at which the terminal device starts to check LBT on the first unlicensed channel to a moment at which the terminal device performs unsuccessful LBT;
  a period of time from a moment at which the terminal device performs unsuccessful LBT to a moment at which the terminal device performs successful LBT;
  a quantity of times of performing unsuccessful LBT during a period of time from a moment at which the terminal device starts to perform channel detection on the first unlicensed channel to a moment at which the terminal device performs successful LBT on the second unlicensed channel; and
  channel occupation information.

Optionally, the second indication information includes at least one of an identifier of the terminal device, an identifier of a cell on which unsuccessful LBT is performed, and a probability of unsuccessful LBT.

Optionally, the request message includes a message 1 or a message 3 in a random access procedure.

According to an eleventh aspect, an embodiment of this application provides a communication apparatus, configured to perform the method in the fifth aspect or any possible implementation of the fifth aspect. Specifically, the apparatus includes units or modules configured to perform the method in the fifth aspect or any possible implementation of the fifth aspect, for example, a transceiver unit and a processing unit.

The processing unit is configured to perform unsuccessful listen before talk (LBT) for channel detection on a first unlicensed channel, and perform successful LBT for channel detection on a second unlicensed channel.

The transceiver unit is configured to send, on the second unlicensed channel, a handover command to a terminal device.

The transceiver unit is further configured to send third indication information to a first access network device, where the third indication information indicates that the terminal device performs unsuccessful LBT for channel detection on the first unlicensed channel before performing channel detection on the second unlicensed channel and performing successful LBT.

Optionally, the third indication information includes:
a period of time from a moment at which channel detection starts to be performed on the first unlicensed channel to a moment at which successful LBT is performed on the second unlicensed channel;
information about a moment at which unsuccessful LBT is performed on the first unlicensed channel;
a period of time from a moment at which LBT starts to be checked on the first unlicensed channel to a moment at which unsuccessful LBT is performed;
a period of time from a moment at which unsuccessful LBT is performed to a moment at which a handover command is successfully sent;
a quantity of times of performing unsuccessful LBT during a period of time from a moment at which channel detection starts to be performed on the first unlicensed channel to a moment at which successful LBT is performed on the second unlicensed channel; and channel occupation information.

Optionally, the third indication information includes at least one of an identifier of the terminal device, an identifier of a cell on which unsuccessful LBT is performed, and a probability of unsuccessful LBT.

According to a twelfth aspect, an embodiment of this application provides a communication apparatus, configured to perform the method in the sixth aspect or any possible implementation of the sixth aspect. Specifically, the apparatus includes units or modules configured to perform the method in the sixth aspect or any possible implementation of the sixth aspect, for example, a transceiver unit and a processing unit.

The transceiver unit is configured to receive third indication information from a second access network device, where the third indication information indicates that a terminal device performs unsuccessful listen before talk (LBT) for channel detection on a first unlicensed channel before performing channel detection on a second unlicensed channel and performing successful LBT.

The processing unit is configured to determine, based on the third indication information, a cause for a mobility problem arising from handover of the terminal device from the second access network device to a first access network device.

Optionally, the third indication information includes:
a period of time from a moment at which the second access network device starts to perform channel detection on the first unlicensed channel to a moment at which the second access network device performs successful LBT on the second unlicensed channel;
information about a moment at which the second access network device performs unsuccessful LBT on the first unlicensed channel;
a period of time from a moment at which the second access network device starts to check LBT on the first unlicensed channel to a moment at which the second access network device performs unsuccessful LBT;
a period of time from a moment at which the second access network device performs unsuccessful LBT to a moment at which the second access network device successfully sends a handover command;
a quantity of times of performing unsuccessful LBT during a period of time from a moment at which the second access network device starts to perform channel detection on the first unlicensed channel to a moment at which the second access network device performs successful LBT on the second unlicensed channel; and channel occupation information.

Optionally, the third indication information includes at least one of an identifier of the terminal device, an identifier of a cell on which unsuccessful LBT is performed, and a probability of unsuccessful LBT.

According to a thirteenth aspect, an embodiment of this application provides a communication apparatus, including a processor and a transceiver. Optionally, the apparatus may further include a memory. The memory is configured to store instructions, and the processor is configured to execute the instructions stored in the memory. When the processor executes the instructions stored in the memory, the processor is enabled to perform the method in any one of the first aspect to the sixth aspect or the possible implementations of the first aspect to the sixth aspect.

According to a fourteenth aspect, an embodiment of this application provides a computer-readable medium, configured to store a computer program. The computer program includes instructions used to perform the method in any one of the first aspect to the sixth aspect or the possible implementations of the first aspect to the sixth aspect.

According to a fifteenth aspect, an embodiment of this application further provides a computer program product including instructions. When the computer program product runs on a computer, the computer is enabled to perform the method in any one of the first aspect to the sixth aspect or the possible implementations of the first aspect to the sixth aspect.

According to a sixteenth aspect, a chip is provided. The chip includes a processor and a communication interface. The processor is configured to invoke instructions from the communication interface and run the instructions. When the processor executes the instructions, the method in any one of the first aspect to the sixth aspect or the possible implementations of the first aspect to the sixth aspect is implemented.

Optionally, the chip may further include a memory. The memory stores instructions. The processor is configured to execute the instructions stored in the memory or instructions from another module. When the instructions are executed, the processor is configured to implement the method in any one of the first aspect to the sixth aspect or the possible implementations of the first aspect to the sixth aspect.

According to a seventeenth aspect, a communication system is provided. The communication system includes an apparatus with functions for implementing the methods and possible designs in the first aspect, and an apparatus with functions for implementing the methods and possible designs in the second aspect.

According to an eighteenth aspect, a communication system is provided. The communication system includes an apparatus with functions for implementing the methods and possible designs in the third aspect, and an apparatus with functions for implementing the methods and possible designs in the fourth aspect.

According to a nineteenth aspect, a communication system is provided. The communication system includes an apparatus with functions for implementing the methods and possible designs in the fifth aspect, and an apparatus with functions for implementing the methods and possible designs in the sixth aspect.

BRIEF DESCRIPTION OF DRAWINGS

FIG. 7 is a schematic diagram of a scenario in which a wrong cell is handed over to;

FIG. 8 is a schematic diagram of another scenario in which a wrong cell is handed over to;

DESCRIPTION OF EMBODIMENTS

The following describes technical solutions of this application with reference to accompanying drawings.

The technical solutions in embodiments of this application may be used in various communication systems, for example, a long term evolution (LTE) system, an LTE frequency division duplex (FDD) system, an LTE time division duplex (TDD) system, a universal mobile telecommunications system (UMTS), a 5th generation (5G) system, new radio (NR), or another evolved communication system.

Figure 1:
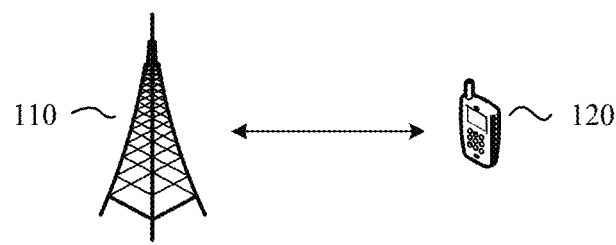
FIG. 1 is a schematic diagram of a communication system applicable to an embodiment of this application.

FIG. 1 is a schematic diagram of a communication system applicable to an embodiment of this application. As shown in FIG. 1, the communication system may include at least one access network device, for example, an access network device 110 shown in FIG. 1. The communication system may further include at least one terminal device, for example, a terminal device 120 shown in FIG. 1. The access network device 110 may communicate with the terminal device 120 over a radio link.

Figure 2:
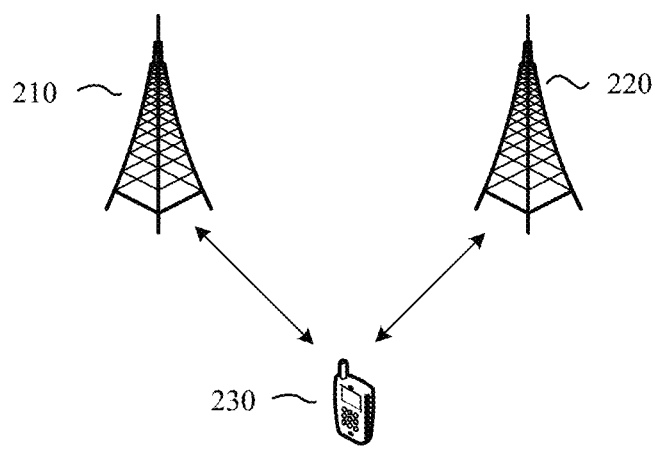
FIG. 2 is another schematic diagram of a communication system applicable to an embodiment of this application.

FIG. 2 is another schematic diagram of a communication system applicable to an embodiment of this application. As shown in FIG. 2, the communication system may include at least two access network devices, for example, access network devices 210 and 220 shown in FIG. 2. The communication system may further include at least one terminal device, for example, a terminal device 230 shown in FIG. 2. The terminal device 230 may establish a radio link to the access network device 210 and the access network device 220 using a dual connectivity (DC) technology or a multi-connectivity technology. The access network device 210 may be, for example, a primary base station, and the access network device 220 may be, for example, a secondary base station. In this case, the access network device 210 is a network device initially accessed by the terminal device 230, and is responsible for radio resource control (RRC) communication with the terminal device 230. The access network device 220 may be added during RRC reconfiguration for provision of additional radio resources.

Alternatively, the access network device 220 may be a primary base station, and the access network device 210 may be a secondary base station. This is not limited in this application. In addition, for ease of understanding only, the figure shows a case in which the two access network devices are wirelessly connected to the terminal device. However, this should not constitute any limitation on a scenario to which this application is applicable. The terminal device may further establish a radio link with more access network devices.

In embodiments of this application, the primary base station and the secondary base station may be base stations of a same radio access type (RAT), or may be base stations of different RATs. This is not limited in embodiments of this application.

Figure 3:
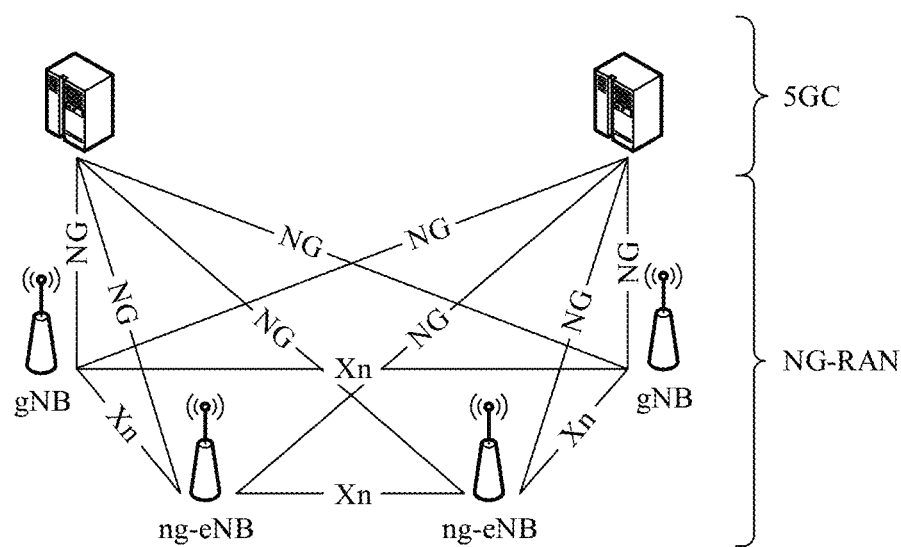
FIG. 3 is another schematic diagram of a communication system applicable to an embodiment of this application.

FIG. 3 shows an example of a 5G wireless communication system. As shown in FIG. 3, an overall architecture of the 5G wireless communication system (also referred to as a 5G system, a 5GS, or the like) includes a 5G core network (also referred to as a 5G Core, a 5GCN, or a 5GC) and an NG access network (radio access network, RAN). The NG-RAN may also be referred to as a 5G-RAN.

For example, as shown in FIG. 3, the NG-RAN includes two types of RAN nodes (RAN node): a gNB and a ng-eNB. The gNB provides terminations of new radio (NR) user plane and control plane protocol stacks for the terminal device. The ng-eNB provides terminations of evolved universal terrestrial radio access (E-UTRA) user plane and control plane protocol stacks for the terminal device. Data transmission is performed between the 5GC and an access device (for example, a gNB or a ng-eNB) in the NG-RAN through an NG interface. Data transmission can be performed between gNBs, between a gNB and a ng-eNB, or between ng-eNBs through Xn interfaces.

FIG. 3 is an example of a schematic diagram of a network architecture. However, this embodiment of this application is not limited thereto. For example, the 5GC may further include more core network devices, and the NG-RAN may further include a base station using another access technology.

A plurality of antennas may be configured for each communication device, for example, the access network device 110 or the terminal device 120 in FIG. 1, or the access network device 210, the access network device 220, or the terminal device 230 in FIG. 2, or each access network device in FIG. 3. The plurality of antennas may include at least one transmit antenna for sending of signals and at least one receive antenna for receiving of signals. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the access network device and the terminal device may communicate with each other using a multi-antenna technology.

The access network device in the wireless communication system may be any device that has a wireless transceiver function. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. The device may alternatively be a gNB or a transmission point (TRP or TP) in a 5G system, for example, an NR system or one or a group of antenna panels (including a plurality of antenna panels) of a base station in the 5G system, or the device may alternatively be a network node that constitutes a gNB or a transmission point, for example, a baseband unit (BBU) or a distributed unit (DU).

In some deployments, a gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the access network device may be a CU node, a DU node, or a device including the CU node and the DU node. In addition, the CU may be classified as a network device in an access network (radio access network, RAN), or may be classified as a network device in a core network (CN). This is not limited in this application.

It should be further understood that the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application.

In a wireless communication system, the terminal device may be handed over between two cells. The two cells may be, for example, two intra-RAT cells or two inter-RAT cells. This is not limited in embodiments of this application. If a handover parameter is set improperly, an intra-RAT or inter-RAT premature handover, a delayed handover, or a ping-pong handover may be caused. Consequently, a cell handover fails or a call drop of the terminal device is caused because the handover is not performed in time.

A mobility optimization algorithm is used for intra-RAT and inter-RAT handover optimization, and problem detection and adjustment of mobility parameters. In an example, in an LTE system or an NR system, a mobility robustness optimization (MRO) algorithm may be used for mobility optimization. Mobility optimization is for monitoring, identification, and statistics collection for inter-RAT handover, and then determining to adjust related inter-RAT handover parameters to ease inter-RAT handover, so as to minimize exceptions of inter-RAT handover and maximally avoid inter-RAT handover performance.

In an example, scenarios and target standardization impact of MRO are as follows.

(1) A terminal device records a radio link failure (RLF) report, and sends the RLF report to an access network device.

(2) The access network device sends an RLF indication to a neighboring access network device.

(3) The access network device sends, to the neighboring access network device, a handover (HO) report indicating a handover event (for example, a premature handover, a delayed handover, or a handover to a wrong cell).

For example, in an LTE system, a base station may send an RLF indication or an HO report to a neighboring base station through an X2 interface. In an NR system, a gNB may send an RLF indication or an HO report to a neighboring gNB through an Xn interface. This is not limited in embodiments of this application.

In addition, when handover succeeds, the terminal device may further record handover success information (successfulHOreport), and send the handover success information to a target access network device after the handover to the target access network device succeeds.

The following describes five handover failure scenarios with reference to FIG. 4 to FIG. 8.

Figure 4:
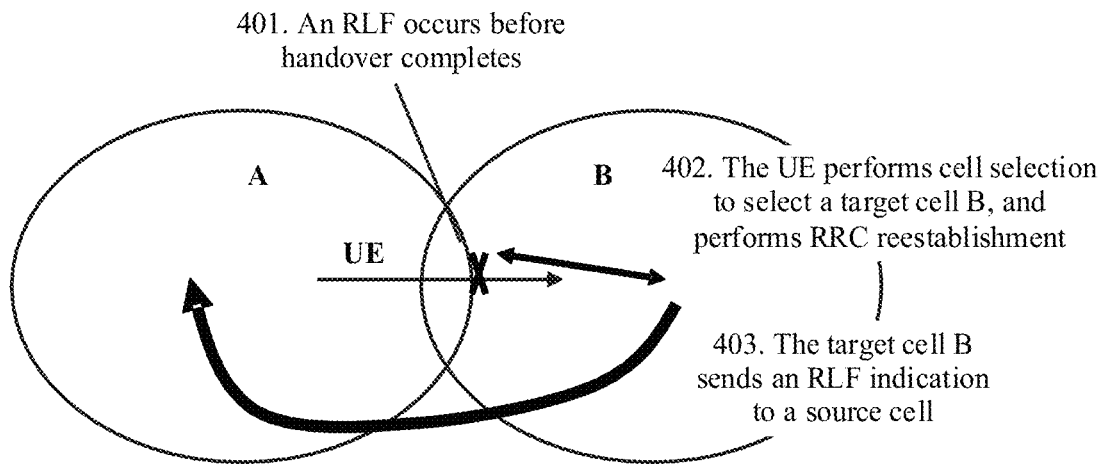
FIG. 4 is a schematic diagram of a scenario in which a handover is delayed.

FIG. 4 is a schematic diagram of a scenario in which a handover is delayed. Specific steps are as follows.

401. A radio link failure (RLF) occurs before handover completes. In this case, handover may not be triggered.

402. UE performs cell selection to select a target cell B, and performs RRC reestablishment.

403. After the reestablishment to the target cell B, the target cell B sends an RLF indication to a source cell, that is, a cell A. For example, the RLF indication may be sent through an X2 interface between a base station of the target cell B and a base station of the source cell A.

In an example, the RLF indication may include information such as an RLF report (recorded and reported by the UE to the base station).

Figure 5:
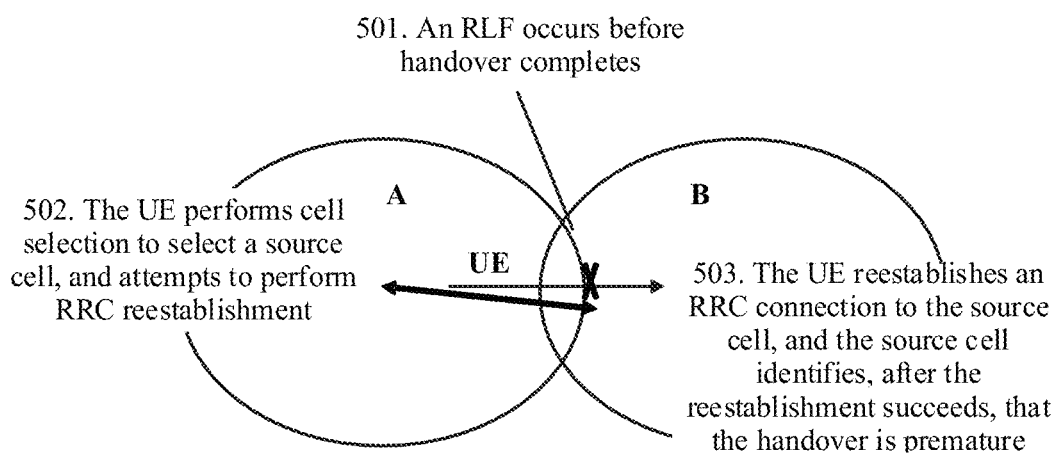
FIG. 5 is a schematic diagram of a scenario in which a handover is premature.

FIG. 5 is a schematic diagram of a scenario in which a handover is premature. Specific steps are as follows.

501. An RLF occurs before handover completes.

502. UE performs cell reselection to select a source cell A, and attempts to perform RRC reestablishment.

503. The UE reestablishes an RRC connection to the source cell A, and the source cell A identifies, after the reestablishment succeeds, that the handover is premature.

Figure 6:
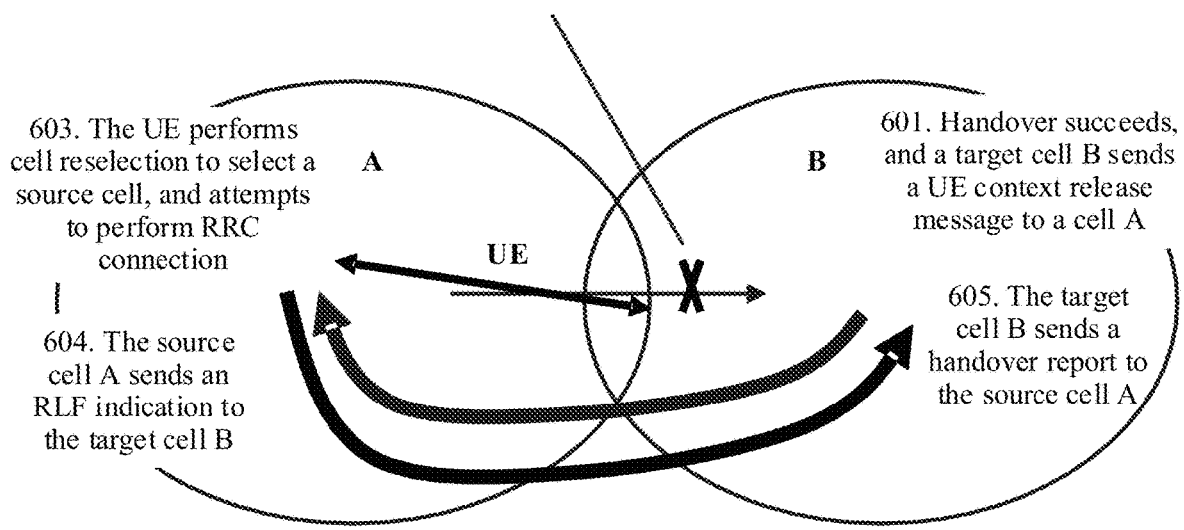
FIG. 6 is a schematic diagram of another scenario in which a handover is premature.

FIG. 6 is a schematic diagram of another scenario in which a handover is premature. Specific steps are as follows.

601. UE is successfully handed over from a source cell A to a target cell B. The target cell B sends a UE context release message to the cell A. Optionally, the UE may start a timer while the UE context release message is sent.

602. An RLF occurs in a very short period of time after the handover completes. For example, a time threshold may be set. When the RLF occurs within timing of the timer less than the threshold, it is considered that the RLF occurs in a very short period of time.

603. The UE performs cell reselection to reselect the source cell A, and attempts to perform RRC connection.

604. After RRC reestablishment completes, the source cell A sends an RLF indication to the cell B. For example, the RLF indication may be sent through an X2 interface between a base station of the target cell B and a base station of the source cell A.

605. When the cell B receives the RLF indication, the timer is still running, and the target cell B sends, to the cell A, a handover report (handoverreport) indicating to the cell A that the handover is a premature handover. For example, the failure report may be sent through the X2 interface between the base station of the target cell B and the base station of the source cell A.

Figure 7:
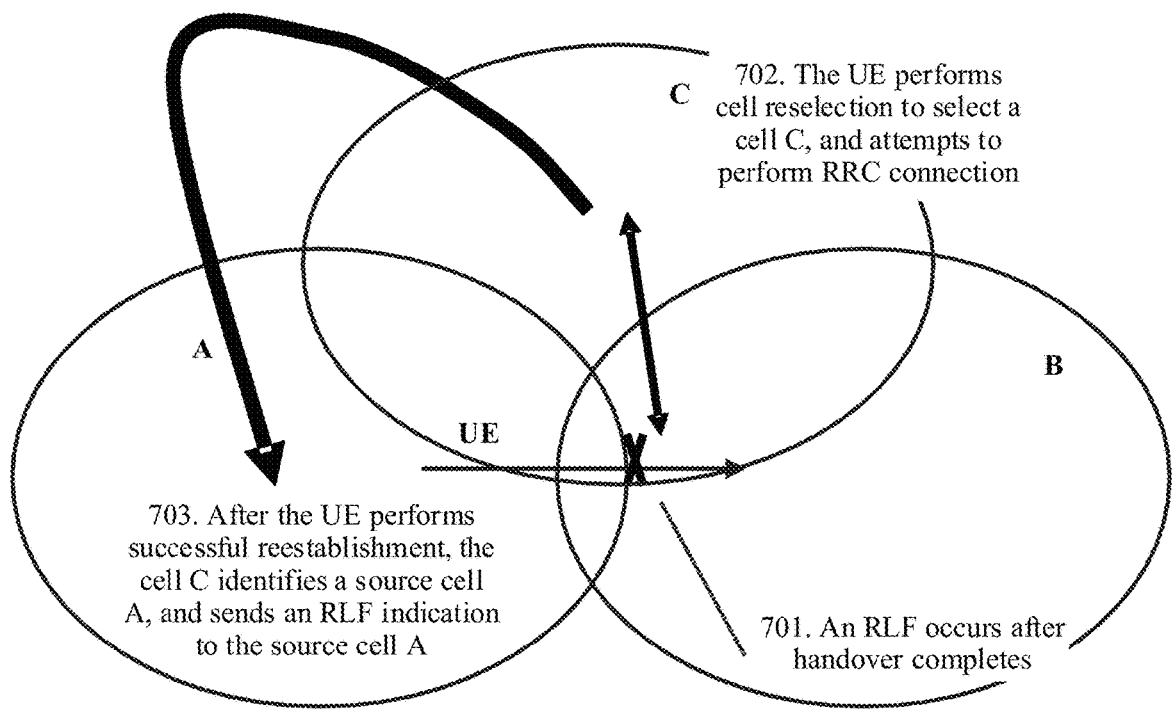

FIG. 7 is a schematic diagram of a scenario in which a wrong cell is handed over to. Specific steps are as follows.

701. An RLF occurs after handover completes. For example, the handover may be performed from a source cell A to a target cell B.

702. UE performs cell selection to select a third cell C, and attempts to perform RRC reestablishment.

703. After the RRC reestablishment, the cell C identifies the source cell A, and sends an RLF indication to the cell A. For example, the RLF indication may be sent through an X2 interface between a base station of the cell C and a base station of the source cell A.

Figure 8:
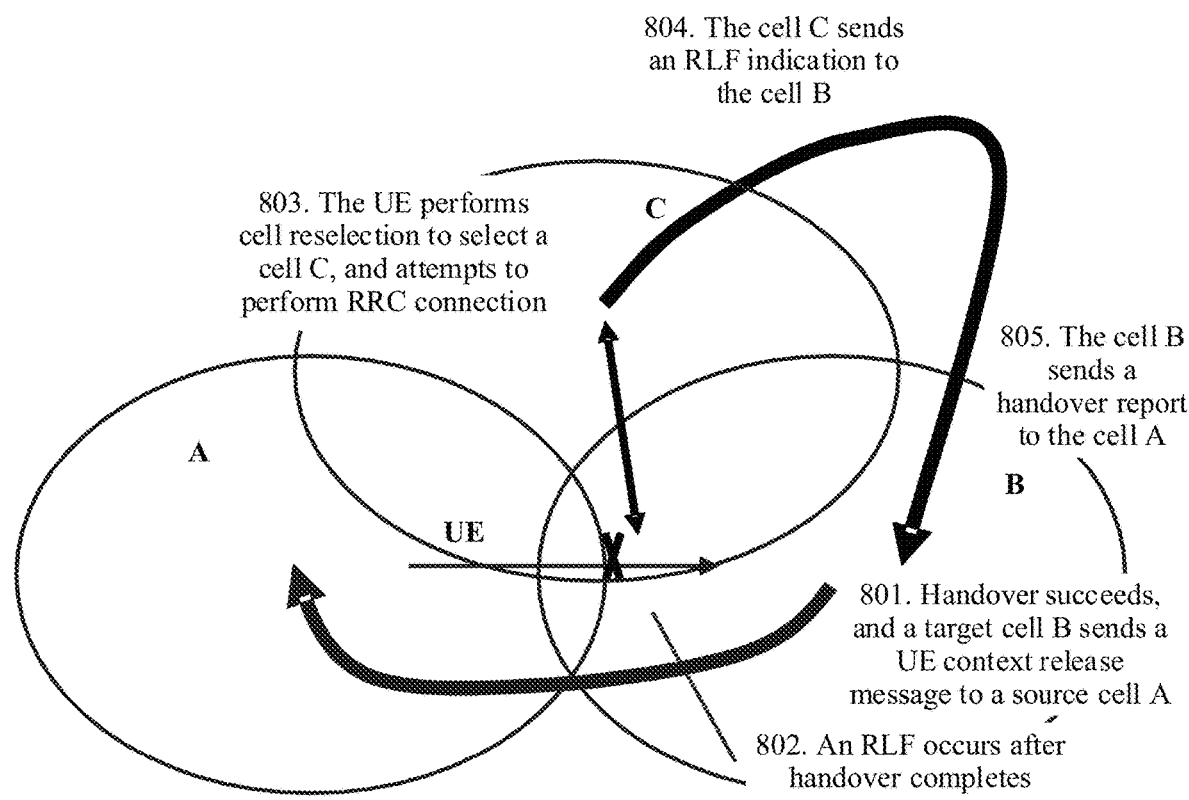

FIG. 8 is a schematic diagram of another scenario in which a wrong cell is handed over to. Specific steps are as follows.

801. UE is successfully handed over from a source cell A to a target cell B. The target cell B sends a UE context release message to the source cell A. Optionally, the UE may start a timer while the UE context release message is sent.

802. An RLF occurs in a very short period of time after handover completes.

803. UE performs cell reselection to reselect a cell C, and performs RRC reestablishment.

804. After the RRC reestablishment, the cell C sends an RLF indication to the cell B. For example, the RLF indication may be sent through an X2 interface between a base station of the cell C and a base station of the cell B.

805. When the cell B receives the RLF indication, the timer is still running (running), and the cell B sends, to the cell A, a handover report (handoverreport) indicating to the cell A that the handover was to a wrong cell once. For example, the failure report may be sent through the X2 interface between the base station of the cell B and a base station of the cell A.

Currently, the wireless communication system supports inter-cell handover between unlicensed-spectrum cells, inter-cell handover between an unlicensed-spectrum cell and an NR cell, or inter-cell handover between an unlicensed-spectrum cell and an LTE cell. For example, in LTE, a 5G unlicensed band cell may be configured as a secondary component carrier. Unlicensed spectrums may be utilized in the case of insufficient licensed spectrums for operators, for offloading for the licensed spectrums. This obtains better coverage and larger capacities than those of Wi-Fi, and achieving smoother user experience.

Unlicensed-spectrum cells may be related for handover, and any individual or entity has the right to use radio resources on unlicensed spectrums in accordance with related laws. Therefore, in a signaling and data transmission process, LBT needs to be performed on cells that use unlicensed spectrums, to avoid mutual interference between neighboring communication devices.

LBT is a channel access procedure defined in 3GPP, which means that channel detection is performed before data transmission, to check whether a current channel is idle. If the channel is idle, a power amplifier (PA) may be enabled for data transmission. If the channel is busy, data transmission is performed only after a period of time to wait the channel being idle. In addition, duration of each data transmission cannot exceed a preset time. That is, data transmission needs to be released when the preset time reaches, and whether data transmission can be performed is detected again through the LBT procedure.

Figure 9:
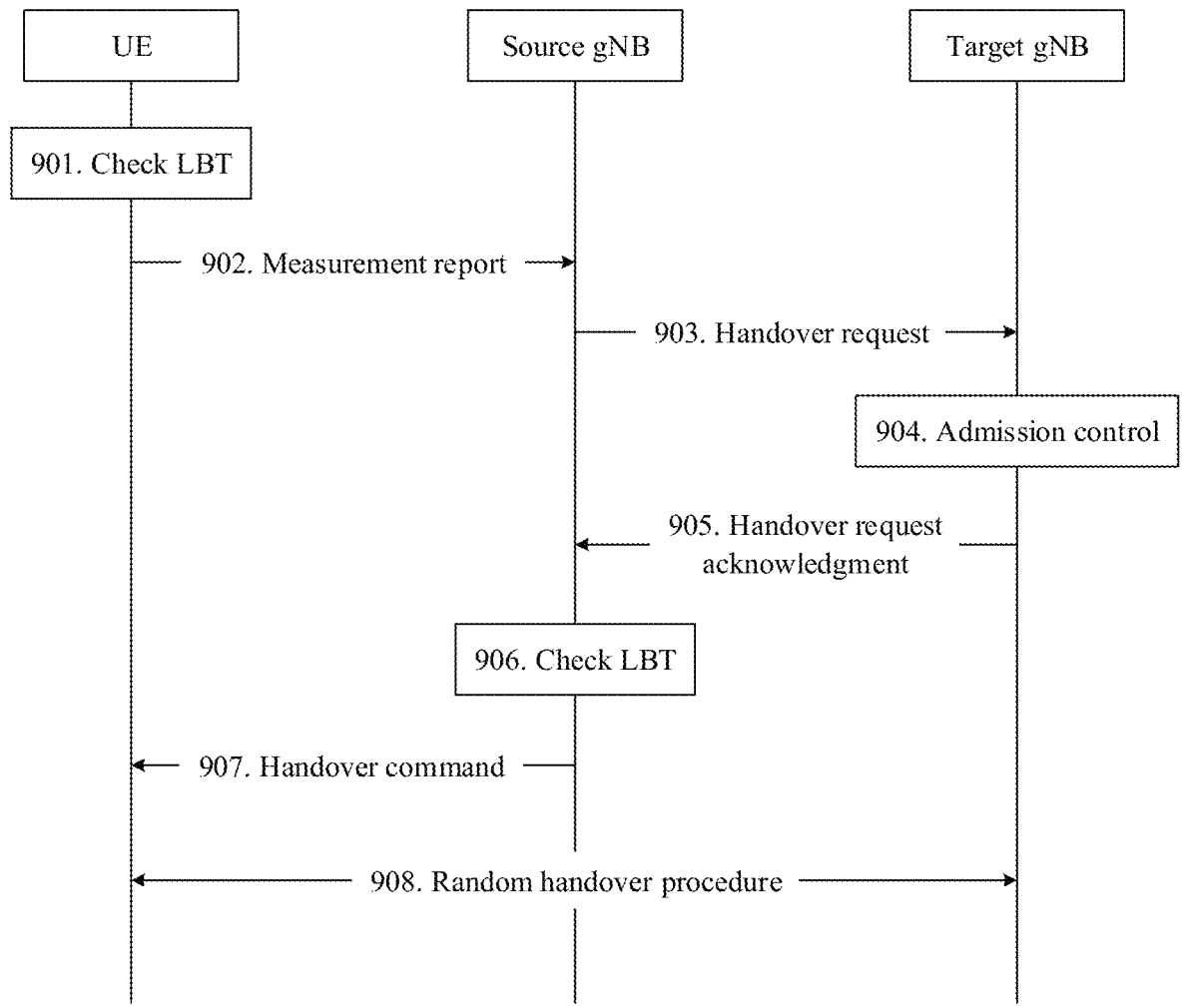
FIG. 9 shows an example process in which UE is handed over between NR unlicensed spectrum cells.

FIG. 9 shows an example process in which UE is handed over between NR unlicensed spectrum cells. The UE is an example of a terminal device, a source gNB is an example of a source access network device, and a target gNB is an example of a target access network device. In a signaling and data transmission process, LBT needs to be performed in each cell that uses an unlicensed spectrum, which means that LBT is performed on both the access network device side and the terminal device side. For example, the handover process includes step 901 to step 909.

901. The UE checks LBT on an unlicensed channel, that is, performs channel detection on the unlicensed channel, to check whether a current unlicensed channel can be used to send data.

When it is detected that the current unlicensed channel is idle, the unlicensed channel may be used by the UE to send data. In this case, the UE performs successful LBT for channel detection on the unlicensed channel. In other words, when the UE performs channel detection on the unlicensed channel and performs successful LBT, the UE obtains, on the unlicensed channel, an unlicensed resource used to send data.

When it is detected that the current unlicensed channel is busy, the unlicensed channel cannot be used by the UE to send data. In this case, the UE performs unsuccessful LBT for channel detection on the unlicensed channel. In other words, when the UE performs channel detection on the unlicensed channel and performs unsuccessful LBT, the UE cannot obtain, on the unlicensed channel, (that is, does not obtain, on the unlicensed channel), the unlicensed resource used to send data.

902. The UE sends a measurement report to a source gNB.

Specifically, the UE sends the measurement report to the source gNB on the unlicensed channel on which successful LBT is performed in step 901. Accordingly, the source gNB receives the measurement report on the unlicensed channel. Subsequently, the source gNB determines, based on the measurement report, to hand over the UE to a target gNB.

903. The source gNB sends a handover request to the target gNB. Accordingly, the target gNB receives the handover request.

904. The target gNB performs admission control on the UE based on the handover request.

905. The target gNB sends a handover request acknowledgment (ACK) to the source gNB.

906. The source gNB checks LBT on an unlicensed channel, that is, performs channel detection on the unlicensed channel, to check whether a current unlicensed channel can be used to send data.

When it is detected that the current unlicensed channel is idle, the unlicensed channel may be used by the source gNB to send data. In this case, the source gNB performs successful LBT for channel detection on the unlicensed channel. In other words, when the source gNB performs channel detection on the unlicensed channel and performs successful LBT, the source gNB obtains, on the unlicensed channel, an unlicensed resource used to send data.

When it is detected that the current unlicensed channel is busy, the unlicensed channel cannot be used by the source gNB to send data. In this case, the source gNB performs unsuccessful LBT for channel detection on the unlicensed channel. In other words, when the source gNB performs channel detection on the unlicensed channel and performs unsuccessful LBT, the source gNB cannot obtain, on the unlicensed channel, (that is, does not obtain, on the unlicensed channel), the unlicensed resource used to send data.

907. The source gNB sends a handover command to the UE.

Specifically, the source gNB sends the handover command to the UE through the unlicensed channel on which successful LBT is performed in step 906. Accordingly, the UE receives the handover command on the unlicensed channel.

908. The UE and the target gNB perform a random access procedure.

Specifically, the UE may initiate the random access procedure to the target gNB. For a specific handover procedure, refer to the handover process in TS36.300. Details are not described herein again.

In a process of performing random access, when sending uplink signaling, for example, a random access request (that is, a message 1 (msg1) in the random access procedure and a message 3 (msg3) in the random access procedure), on an unlicensed channel, the UE needs to check LBT on the unlicensed channel, and sends the uplink signaling only when the UE performs successful LBT on the unlicensed channel. Similarly, when sending downlink signaling on an unlicensed channel, for example, a message 2 (msg2) in the random access procedure and a message 4 (msg4) in the random access procedure, the target gNB needs to check LBT on the unlicensed channel, and sends the downlink signaling only when the target gNB performs successful LBT on the unlicensed channel.

The target gNB checks LBT on an unlicensed channel. To be specific, the target gNB performs channel detection on the unlicensed channel to check whether a current unlicensed channel can be used to send data. When it is detected that the current unlicensed channel is idle, the unlicensed channel may be used by the target gNB to send data. In this case, the target gNB performs successful LBT for channel detection on the unlicensed channel. In other words, when the target gNB performs channel detection on the unlicensed channel and performs successful LBT, the target gNB obtains, on the unlicensed channel, an unlicensed resource used to send data. When it is detected that the current unlicensed channel is busy, the unlicensed channel cannot be used by the target gNB to send data. In this case, the target gNB performs unsuccessful LBT for channel detection on the unlicensed channel. In other words, when the target gNB performs channel detection on the unlicensed channel and performs unsuccessful LBT, the target gNB cannot obtain, on the unlicensed channel, (that is, does not obtain, on the unlicensed channel), the unlicensed resource used to send data.

It should be noted that, in this embodiment of this application, when the gNB or the UE performs unsuccessful LBT for channel detection on a first unlicensed channel, the gNB or the UE may further continue to perform channel detection on a second unlicensed channel. When the gNB or the UE performs successful LBT for channel detection on the second unlicensed channel, it may be considered that the gNB or the UE performs successful LBT on the unlicensed channel, but the gNB or the UE has performed unsuccessful LBT during channel detection. In this case, the gNB or the UE finally finds a suitable unlicensed resource on the unlicensed channel to send data.

Optionally, when the gNB or the UE performs unsuccessful LBT on all unlicensed channels of a cell, or a quantity of times of performing LBT reaches a preset quantity of times, or a period of time for channel detection exceeds a preset period of time, it may be considered that the gNB or the UE finally performs unsuccessful LBT.

For example, in an NR system, channel detection may be performed on a plurality of different unlicensed channels in one bandwidth part (BWP). In other words, when unsuccessful LBT is performed for channel detection on an unlicensed channel in a BWP, channel detection may be performed on another unlicensed channel in the BWP. When unsuccessful LBT is performed for channel detection on all unlicensed channels in a BWP, the BWP may be replaced for checking LBT. When unsuccessful LBT is performed for channel detection on unlicensed channels in all BWPs, it is considered that LBT fails.

The BWP may be a set of consecutive frequency domain resources on a carrier. Different BWPs may occupy frequency domain resources that partially overlap, or may occupy frequency domain resources that do not overlap. The frequency domain resources occupied by the different BWPs may have a same bandwidth or different bandwidths. This is not limited in this application.

In this embodiment of this application, when the gNB or the UE performs unsuccessful LBT for channel detection on the unlicensed channel, sending failures of signaling or data incur, where the unsuccessful LBT is final unsuccessful LBT. In other words, when the gNB or the UE does not find a suitable unlicensed resource on the unlicensed channel to send data, sending failures of signaling or data incur.

Optionally, in this embodiment of this application, in a process in which the gNB or the UE performs channel detection on the unlicensed channel, a quantity of times of performing unsuccessful LBT on the unlicensed channel, a probability of unsuccessful LBT, BWP information of the unlicensed channel, or the like may be recorded. This is not limited in this embodiment of this application.

In step 908, when the UE fails to perform random access to the target gNB, the UE may reestablish an RRC connection to the source gNB, or reselect to another gNB for RRC reestablishment. Subsequently, the UE sends a radio link failure report to the source gNB. The source gNB may determine, based on the radio link failure report, whether handover is premature or delayed, or whether a wrong cell is handed over to, so as to adjust a mobility parameter. Based on this solution, whether a mobility problem is caused by unsuccessful LBT cannot be identified, and consequently, the mobility problem caused by unsuccessful LBT cannot be resolved.

In view of this, embodiments of this application provide a communication method. In the method, in a scenario in which a terminal device is handed over from a source access network device to a target access network device, when performing unsuccessful LBT on an unlicensed channel, the source access network device, the target access network device, or the terminal device sends indication information indicating unsuccessful LBT, so that cause analysis for a handover failure (or handover delay) can be performed based on the indication information in the handover process.

The following describes embodiments of this application in detail with reference to the accompanying drawings.

The technical solutions of this application may be applied to a wireless communication system, for example, the communication system shown in FIG. 1, the communication system shown in FIG. 2, or the communication system shown in FIG. 3. There may be a wireless communication connection relationship between communication apparatuses in the wireless communication system. One of the communication apparatuses may be, for example, a first access network device or a chip configured in the access network device. Another apparatus of the communication apparatuses may be, for example, a second access network device or a chip configured in the access network device. Another apparatus of the communication apparatuses may be, for example, a terminal device or a chip configured in the terminal device. This is not limited in embodiments of this application.

Without loss of generality, embodiments of this application are first described in detail by using a communication process of a terminal device as an example. It may be understood that any terminal device in the wireless communication system or a chip configured in the terminal device may perform communication using the same method, and any access network device in the wireless communication system or a chip configured in the access network device may perform communication using the same method. This is not limited in this application.

In embodiments of this application, the terminal device is handed over from the second access network device to the first access network device. In other words, the first access network device may be a target access network device, and the second access network device may be a source access network device. For ease of description, an example in which the first access network device is a target gNB, the second access network device is a source gNB, and the terminal device is UE is used below for description. However, embodiments of this application are not limited thereto.

Figure 10A:
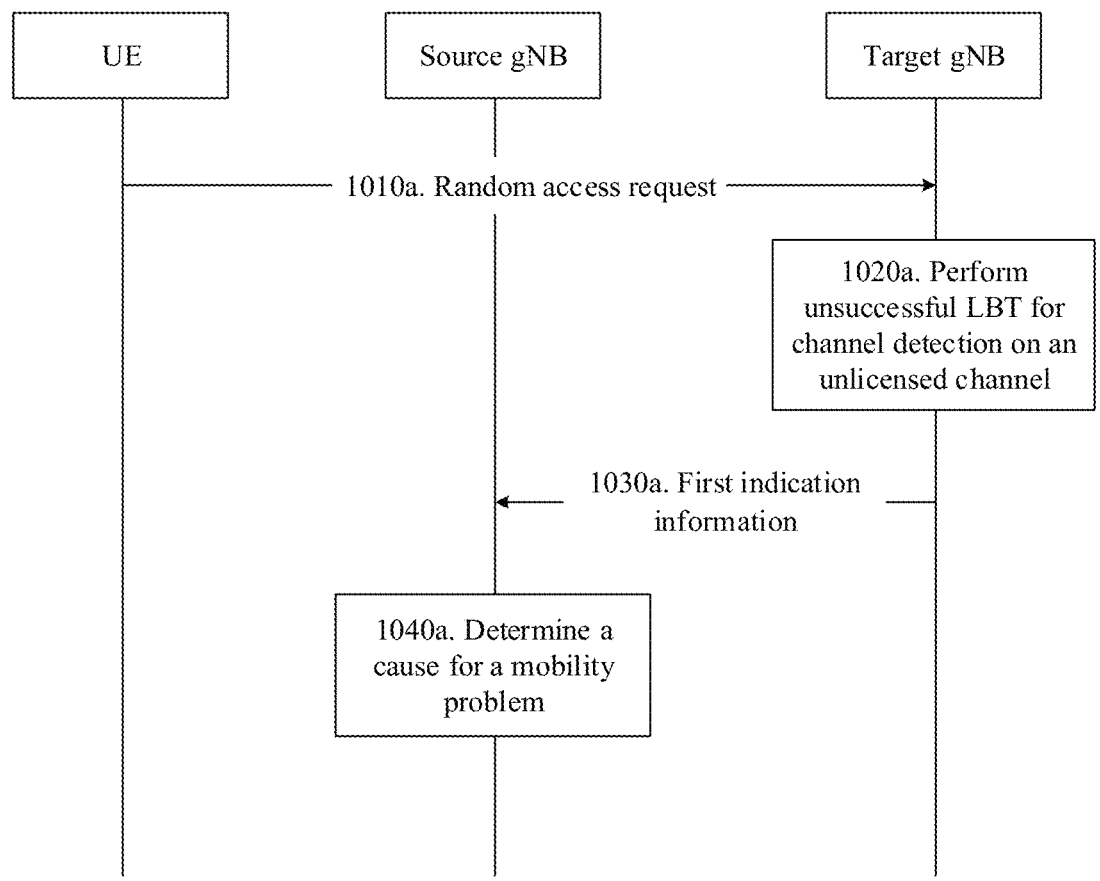
FIG. 10A is a schematic flowchart of a communication method according to an embodiment of this application.

FIG. 10A is a schematic flowchart of a communication method from a perspective of device interaction. In the method, when UE performs random access to a target gNB, the target gNB performs unsuccessful LBT for channel detection on an unlicensed channel. As shown in FIG. 10A, the method includes step 1010a to step 1040a.

1010a. The UE sends a random access request to the target gNB.

Accordingly, the target gNB receives the random access request sent by the UE. For example, for a process in which the UE sends the random access request to the target gNB, refer to the following descriptions in FIG. 10B. Details are not described herein.

1020a. The target gNB performs unsuccessful LBT for channel detection on the unlicensed channel.

Because unsuccessful LBT occurs, the target gNB cannot send data to the UE, for example, a message 2 (msg2) or a message 4 (msg4) in the random access procedure. Consequently, the UE fails to perform random access to the target gNB.

Figure 10B:
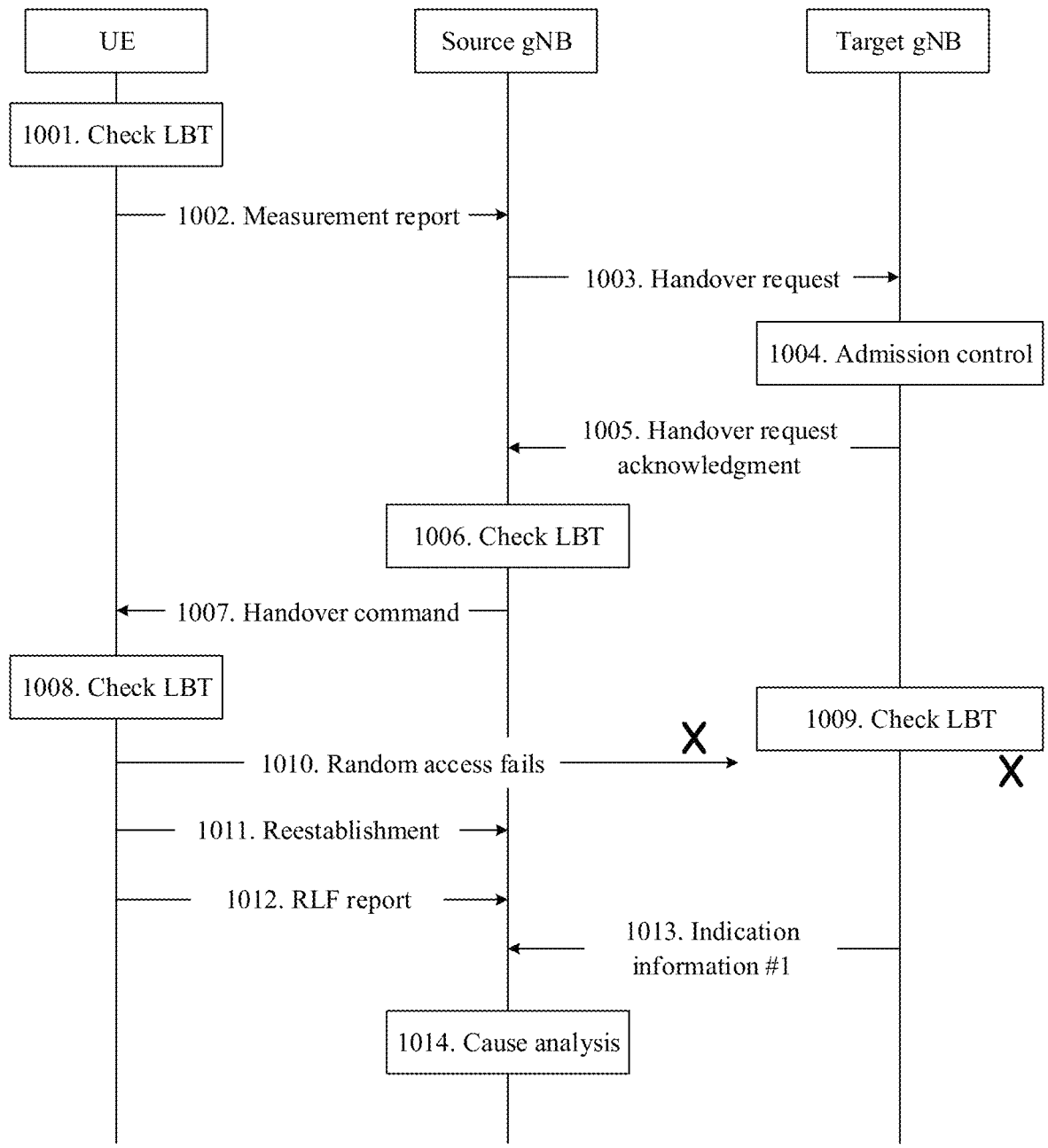
FIG. 10B is a schematic flowchart of another communication method according to an embodiment of this application.

For example, step 1009 in FIG. 10B may be a specific example of step 1020a. For details, refer to the following description of step 1009 in FIG. 10B. Details are not described herein.

1030a. The target gNB sends first indication information to a source gNB. The first indication information indicates that the target gNB performs unsuccessful LBT for channel detection on the unlicensed channel.

Accordingly, the source gNB receives the first indication information sent by the target gNB.

For example, step 1013 in FIG. 10B may be a specific example of step 1030a. For details, refer to the following description of step 1013 in FIG. 10B. Details are not described herein. Indication information #1 may be a specific example of the first indication information.

1040a. The source gNB determines a cause for a mobility problem. For example, the source gNB determines, based on the first indication information, a cause for the mobility problem arising from handover of the UE from the source gNB to the target gNB, that is, a mobility problem caused by unsuccessful LBT.

In an example, step 1014 in FIG. 10B may be a specific example of step 1040a. For details, refer to the following description of step 1014 in FIG. 10B. Details are not described herein.

Therefore, in this embodiment of this application, when the UE fails to perform random access to the target gNB due to unsuccessful LBT performed by the target gNB for channel detection on an unlicensed channel, the target gNB may send, to the source gNB, indication information indicating unsuccessful LBT, so that the source gNB can perform cause analysis for the handover failure based on the indication information. Therefore, in this embodiment of this application, the mobility problem arising from unsuccessful LBT can be identified and distinguished from a conventional mobility problem, and further the mobility problem is resolved by adjusting a corresponding parameter.

FIG. 10B is a schematic flowchart of a communication method from a perspective of device interaction. In the method, when UE performs random access to a target gNB, the target gNB performs unsuccessful LBT for channel detection on an unlicensed channel. As shown in FIG. 10B, the method includes step 1001 to step 1014.

1001. The UE checks LBT on the unlicensed channel.

1002. The UE sends a measurement report to a source gNB.

1003. The source gNB sends a handover request to the target gNB. Accordingly, the target gNB receives the handover request.

1004. The target gNB performs admission control on the UE based on the handover request.

1005. The target gNB sends a handover request acknowledgment (ACK) to the source gNB.

1006. The source gNB checks LBT on the unlicensed channel.

1007. The source gNB sends a handover command to the UE.

Specifically, for step 1001 to step 1007, refer to descriptions of step 901 to step 907 in FIG. 9. For brevity, details are not described herein again.

1008. The UE checks LBT on the unlicensed channel in a random access procedure. In addition, in a case of performing successful LBT for channel detection on the unlicensed channel (which means that the unlicensed channel may be used by the UE to send data), the UE sends uplink signaling to the target gNB.

In some embodiments, after random access initialization completes, the UE may check LBT on the unlicensed channel, and send a random access request (that is, an msg1) to the target gNB on the unlicensed channel in a case of performing successful LBT for channel detection on the unlicensed channel.

In some embodiments, after receiving an msg2 sent by the target gNB, the UE may check LBT on the unlicensed channel, and send an msg3 to the target gNB on the unlicensed channel in a case of performing successful LBT for channel detection on the unlicensed channel.

1009. In the random access procedure, the target gNB checks LBT on the unlicensed channel, and performs unsuccessful LBT for channel detection on the unlicensed channel (which means that the unlicensed channel cannot be used by the target gNB to send data).

In some embodiments, after receiving the random access request (that is, the msg1) sent by the UE, the target gNB checks LBT on the unlicensed channel, and performs unsuccessful LBT for channel detection on the unlicensed channel. In this case, the unlicensed channel cannot be used by the target gNB to send the msg2 to the UE. In other words, the target gNB cannot obtain an unlicensed resource for sending the msg2. To be specific, the target gNB performs unsuccessful LBT when attempting to send, on the unlicensed channel, the msg2 to the UE, and consequently, the msg2 fails to be sent.

In some embodiments, after receiving the random access request (that is, the msg1) sent by the UE, the target gNB checks LBT on the unlicensed channel, and the target gNB may send the msg2 to the UE through the unlicensed channel when performing successful LBT for channel detection on the unlicensed channel. Subsequently, the target gNB receives the msg3 sent by the UE. In this case, the target gNB may check LBT on the unlicensed channel again, and perform unsuccessful LBT for channel detection on the unlicensed channel. In this case, the unlicensed channel cannot be used by the target gNB to send an msg4 to the UE. In other words, the target gNB cannot obtain an unlicensed resource for sending the msg4. To be specific, the target gNB performs unsuccessful LBT when attempting to send, on the unlicensed channel, the msg4 to the UE, and consequently, the msg4 fails to be sent.

1010. Random access fails.

In a possible case, when the target gNB cannot send the msg2 to the UE, a random access failure occurs.

In another possible case, when the target gNB cannot send the msg4 to the UE, a random access failure occurs.

In this case, the UE experiences the radio link failure on the target gNB.

1011. The UE reestablishes (reestablish) an RRC connection to the source gNB. In this case, it may also be referred to as that the UE performs reselection to the source gNB.

In some embodiments, the UE may alternatively perform reselection to another gNB. This is not limited in this embodiment of this application.

1012. The UE sends an RLF report to the source gNB. Accordingly, the source gNB receives the RLF report.

Specifically, for the RLF report, refer to descriptions in the current technology (3GPP TS 36.331). Details are not described herein.

1013. The target gNB sends indication information #1 to the source gNB, where the indication information #1 indicates that unsuccessful LBT is performed on the unlicensed channel. Accordingly, the source gNB receives the indication information #1.

In an example, the indication information #1 may include at least one of an identifier (ID) of the UE, an identifier of a cell on which unsuccessful LBT is performed, a probability of unsuccessful LBT in the cell on which unsuccessful LBT is performed, and the like.

For example, the cell on which unsuccessful LBT is performed is, for example, a target cell A, and the identifier of the cell on which unsuccessful LBT is performed is, for example, a cell radio network temporary identifier (CRNTI) or a UE Xn interface identifier (UEXnAPID) of the target cell A. This is not limited in this embodiment of this application.

Step 1013, step 1011, and step 1012 are not limited in performing sequence. In other words, step 1013 may be performed before or after step 1011 or step 1012, or step 1013 and step 1011 or step 1012 may be simultaneously performed, which all fall within the protection scope of this embodiment of this application.

1014. After receiving the RLF report and the indication information #1, the source gNB may perform cause analysis for a handover failure based on the RLF report and the indication information #1. In an example, the source gNB may determine, based on the indication information #1, that a mobility problem (for example, a handover failure) is caused because the target gNB performs unsuccessful LBT for channel detection on the unlicensed channel in the handover process. In this case, a corresponding parameter of the target gNB on the unlicensed channel may be adjusted.

In some optional embodiments, when the target gNB performs unsuccessful LBT for channel detection on the unlicensed channel, and consequently the msg2 cannot be sent, because CRNTIs of UE are delivered in the msg2, the target gNB cannot know which UE fails in random access. Consequently, an identifier of the UE carried in the indication information #1 cannot be determined. In this case, the following two manners may be used to determine which UE fails in random access.

Manner 1.

A dedicated random access resource is configured for each UE. In this case, the target gNB may identify the UE based on a dedicated preamble sent by the UE, to identify, when the random access fails, which UE fails in random access.

Manner 2.

When UE uses a common random access resource, a timer may be defined on a per UE basis for the target gNB. In this case, the timer may be used by the target gNB to identify the UE.

In a possible implementation, when step 1005 is performed, to be specific, when the target gNB sends the handover request acknowledgment to the source gNB, the target gNB starts a timer corresponding to the UE. When the timer of the UE expires, it may be determined that the UE fails in random access.

In another possible implementation, when there are a plurality of candidate gNBs to be handed over to (that is, the source gNB selects a plurality of gNBs as target gNBs), the source gNB may send, after determining a target gNB, indication information #2 to the determined target gNB. The indication information #2 indicates to start a timer corresponding to the UE. Optionally, the target gNB may start the timer after receiving the indication information #2, or the target gNB starts the timer when sending the handover request acknowledgment to the source gNB. This is not limited in this embodiment of this application.

In some optional embodiments, timing of the timer may be T. To be specific, when the timing of the timer exceeds T, it is considered that the timer expires. For example, when the timer is started when the target gNB sends the handover request acknowledgment, $T > T_0$ can be set, where $T_0$ indicates a period of time from a moment at which the target gNB sends the handover request acknowledgment to the source gNB to a moment at which the UE successfully sends the random access request (that is, the msg1) to the target gNB, and $T_0$ is usually fixed.

In other words, after receiving the random access request sent by the UE, the target gNB performs channel detection on the unlicensed channel, to be specific, attempts to send the msg2 to the UE. When the target gNB still fails to send the msg2 after receiving the random access request for a period of time (the period of time may be denoted as $T_1$, and $T_1 = T - T_0$), it may be considered that the target gNB performs unsuccessful LBT on the unlicensed channel. In this case, the target gNB may identify, based on the timer, the UE that fails in random access, that is, consider the UE corresponding to the timer as the UE that fails in random access.

Therefore, in this embodiment of this application, in a scenario in which the UE is handed over from the source gNB to the target gNB, when the UE fails to perform random access to the target gNB due to unsuccessful LBT performed by the target gNB for channel detection on an unlicensed channel, the target gNB may send, to the source gNB, indication information indicating unsuccessful LBT, so that the source gNB can perform analysis for the handover failure based on the indication information. Therefore, in this embodiment of this application, the mobility problem arising from unsuccessful LBT can be identified and distinguished from a conventional mobility problem, and further the mobility problem is resolved by adjusting a corresponding parameter.

Figure 11:
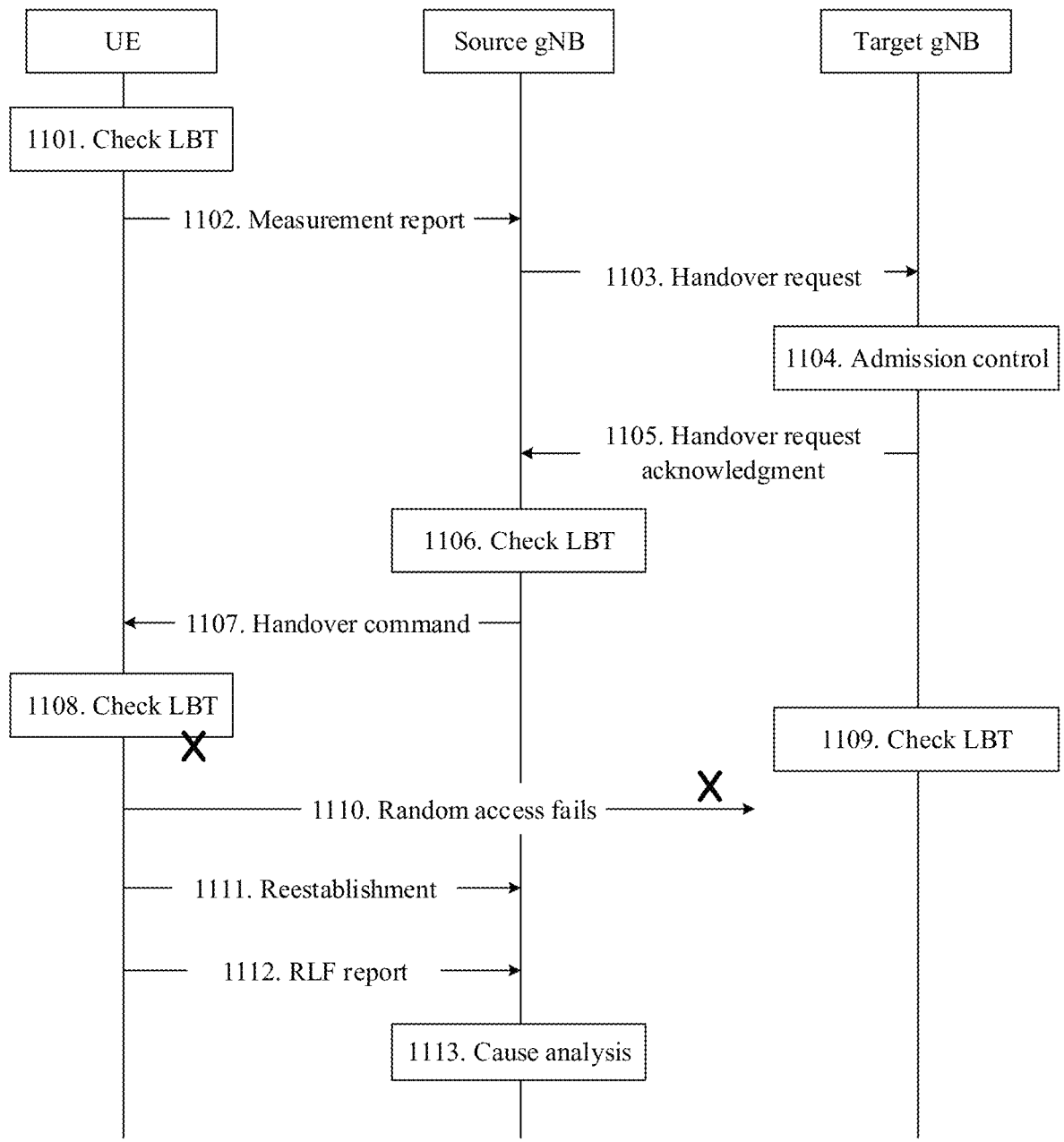
FIG. 11 is a schematic flowchart of another communication method according to an embodiment of this application.

FIG. 11 is a schematic flowchart of another communication method from a perspective of device interaction. In the method, when UE performs random access to a target gNB, the UE performs unsuccessful LBT for channel detection on an unlicensed channel, resulting in a random access failure. As shown in FIG. 11, the method includes step 1101 to step 1113.

1101. The UE checks LBT on the unlicensed channel.

1102. The UE sends a measurement report to a source gNB.

1103. The source gNB sends a handover request to the target gNB. Accordingly, the target gNB receives the handover request.

1104. The target gNB performs admission control on the UE based on the handover request.

1105. The target gNB sends a handover request acknowledgment (ACK) to the source gNB.

1106. The source gNB checks LBT on the unlicensed channel.

1107. The source gNB sends a handover command to the UE.

Specifically, for step 1101 to step 1107, refer to descriptions of step 901 to step 907 in FIG. 9. For brevity, details are not described herein again.

1108. In a random access procedure, the UE checks LBT on the unlicensed channel, and performs unsuccessful LBT for channel detection on the unlicensed channel (which means that the unlicensed channel cannot be used by the UE to send data).

In some embodiments, after receiving the handover command sent by the source gNB, the UE checks LBT on the unlicensed channel, and performs unsuccessful LBT for channel detection on the unlicensed channel. In this case, the unlicensed channel cannot be used by the UE to send a random access request (that is, an msg1) to the target gNB. In other words, the UE cannot obtain an unlicensed resource for sending the random access request. To be specific, the UE performs unsuccessful LBT when attempting to send, on the unlicensed channel, the random access request to the target gNB, and consequently, the random access request fails to be sent.

In some embodiments, after receiving the handover command sent by the source gNB, the UE checks LBT on the unlicensed channel, and in a case of performing successful LBT for channel detection on the unlicensed channel, the UE may send the random access request to the target gNB through the unlicensed channel. Subsequently, the UE receives an msg2 sent by the target gNB. In this case, the UE may check LBT on the unlicensed channel again, and perform unsuccessful LBT for channel detection on the unlicensed channel. In this case, the unlicensed channel cannot be used by the UE to send an msg3 to the target gNB. In other words, the UE cannot obtain an unlicensed resource for sending the msg3. To be specific, the UE performs unsuccessful LBT when attempting to send, on the unlicensed channel, the msg3 to the target gNB, and consequently, the msg3 fails to be sent.

1109. In the random access procedure, the target gNB checks LBT on the unlicensed channel, and sends downlink signaling to the UE in a case of performing successful LBT for channel detection on the unlicensed channel (which means that the unlicensed channel may be used by the target gNB to send data).

In some embodiments, after receiving the random access request sent by the UE, the target gNB may check LBT on the unlicensed channel, and in a case of performing successful LBT for channel detection on the unlicensed channel, sends the msg2 to the UE through the unlicensed channel.

1110. Random access fails.

In a possible case, when the UE cannot send the random access request to the target gNB, the random access failure occurs.

In another possible case, when the UE cannot send the msg3 to the target gNB, the random access failure occurs.

In this case, the UE experiences a radio link failure on the target gNB.

1111. The UE reestablishes (reestablish) an RRC connection to the source gNB. In this case, it may also be referred to as that the UE performs reselection to the source gNB.

In some embodiments, the UE may alternatively perform reselection to another gNB. This is not limited in this embodiment of this application.

1112. The UE sends an RLF report to the source gNB. Accordingly, the source gNB receives the RLF report.

The RLF report includes indication information #3, and the indication information #3 indicates that unsuccessful LBT is performed for channel detection on the unlicensed channel. For example, the RLF report may include a failure cause (cause value), and the failure cause indicates unsuccessful LBT. In other words, in this case, the failure cause may be a specific example of the indication information #3.

In an example, the indication information #3 may include at least one of an identifier (ID) of the UE, an identifier of a cell on which unsuccessful LBT is performed, a probability that UE performs unsuccessful LBT in the cell on which unsuccessful LBT is performed, a quantity of times that the UE performs unsuccessful LBT in the cell on which unsuccessful LBT is performed, and the like.

Optionally, the UE may directly send the indication information #3 to the source gNB, or include the indication information #3 in another message or signaling. This is not limited in this embodiment of this application.

In some optional embodiments, the RLF report further includes at least one of the following:

a period of time from a moment at which the UE receives a handover command to a moment at which the UE starts to check LBT on the unlicensed channel;

a period of time from a moment at which the UE starts to check LBT on the unlicensed channel to a moment at which unsuccessful LBT is performed;

a period of time from a moment at which unsuccessful LBT is performed to a moment at which the UE succeeds in reestablishment; and information about a BWP of the unlicensed channel.

Optionally, when the UE performs unsuccessful LBT on an unlicensed channel of a first BWP, and switches to a second BWP for channel detection, the RLF report may further include at least one of the following:

information about the first BWP and information about the second BWP; and a period of time from a moment at which the UE performs unsuccessful LBT on the first BWP to a moment at which the UE checks LBT on the second BWP.

In addition, the RLF report may further include content included in an existing RLF report. For details, refer to descriptions in the current technology (3GPP TS 36.331), and details are not described herein.

1113. After receiving the RLF report, the source gNB may perform cause analysis for a handover failure based on the RLF report. In an example, the source gNB may determine, based on the indication information #3 in the RLF report, that a mobility problem (for example, the handover failure) is caused because the UE performs unsuccessful LBT for channel detection on the unlicensed channel in the handover process. In this case, a corresponding parameter of the UE on the unlicensed channel may be adjusted.

Therefore, in this embodiment of this application, in a scenario in which the UE is handed over from the source gNB to the target gNB, when the UE fails to perform random access to the target gNB due to unsuccessful LBT performed by the target gNB for channel detection on the unlicensed channel, the UE may send, to the source gNB, indication information indicating unsuccessful LBT, so that the source gNB can perform cause analysis for the handover failure based on the indication information. Therefore, in this embodiment of this application, the mobility problem arising from unsuccessful LBT can be identified and distinguished from a conventional mobility problem, and further the mobility problem is resolved by adjusting a corresponding parameter.

Figure 12A:
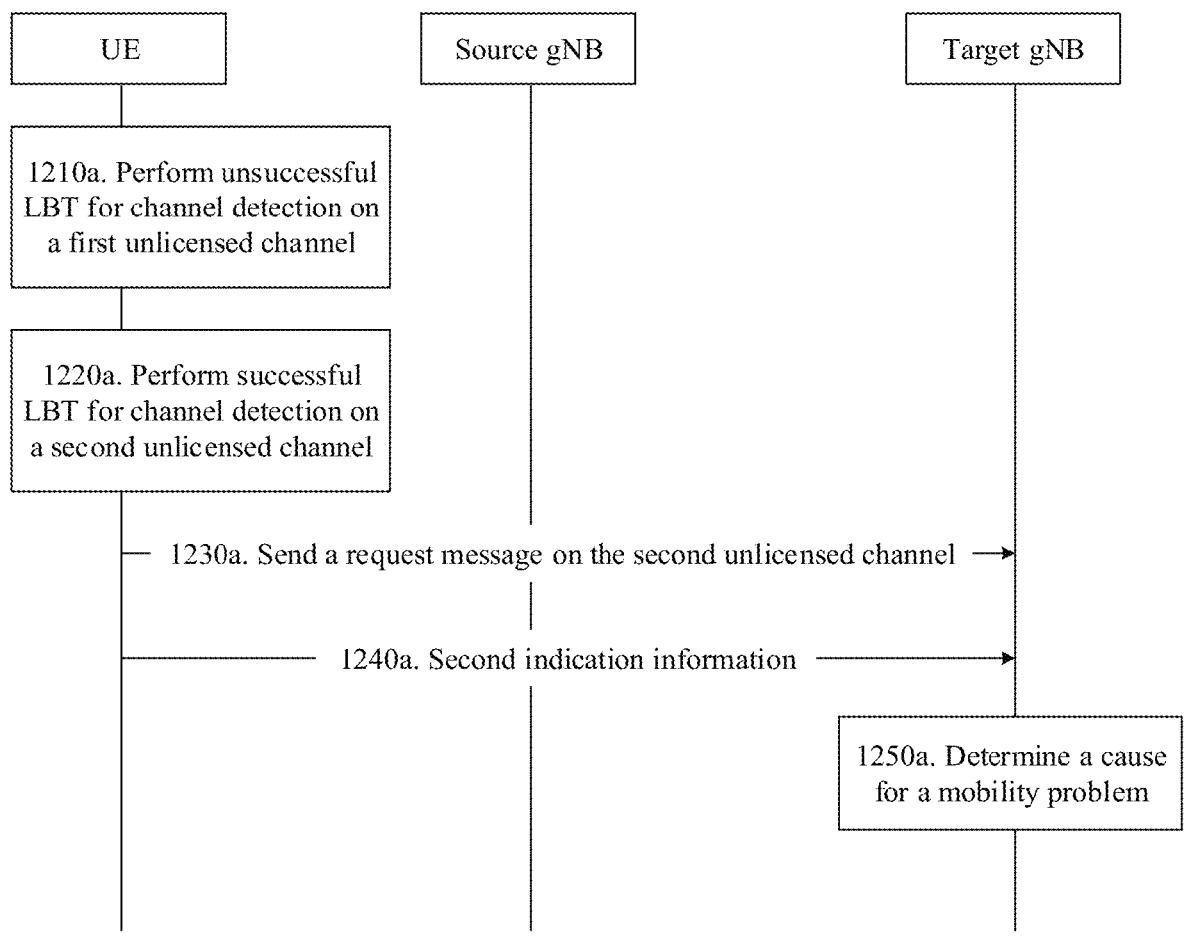
FIG. 12A is a schematic flowchart of another communication method according to an embodiment of this application.

FIG. 12A is a schematic flowchart of another communication method from a perspective of device interaction. In the method, when performing random access to a target gNB, UE performs successful LBT for channel detection on an unlicensed channel. However, the UE has performed unsuccessful LBT for channel detection. In other words, in the method, the UE finally successfully accesses the target gNB. As shown in FIG. 12A, the method includes step 1210*a* to step 1250*a*.

1210*a*. The UE performs unsuccessful LBT for channel detection on a first unlicensed channel.

1220*a*. The UE performs successful LBT for channel detection on a second unlicensed channel.

1230*a*. The UE sends, on the second unlicensed channel, a request message to the target gNB. Accordingly, the target gNB receives the request message sent by the UE.

In other words, the UE performs successful LBT for channel detection on the unlicensed channel, and sends, on the unlicensed channel on which successful LBT is performed, the request message to the target gNB. Finally, the UE successfully performs random access to the target gNB. However, the UE has performed unsuccessful LBT for channel detection. For example, step 1208 in FIG. 12B may be a specific example of step 1210*a* and step 1220*b*. For details, refer to the following description of step 1208 in FIG. 12B. Details are not described herein.

1240*a*. The UE sends second indication information to the target gNB. The second indication information indicates that the UE performs unsuccessful LBT for channel detection on the first unlicensed channel before performing channel detection on the second unlicensed channel and performing successful LBT.

Accordingly, the target gNB receives the second indication information sent by the UE.

Figure 12B:
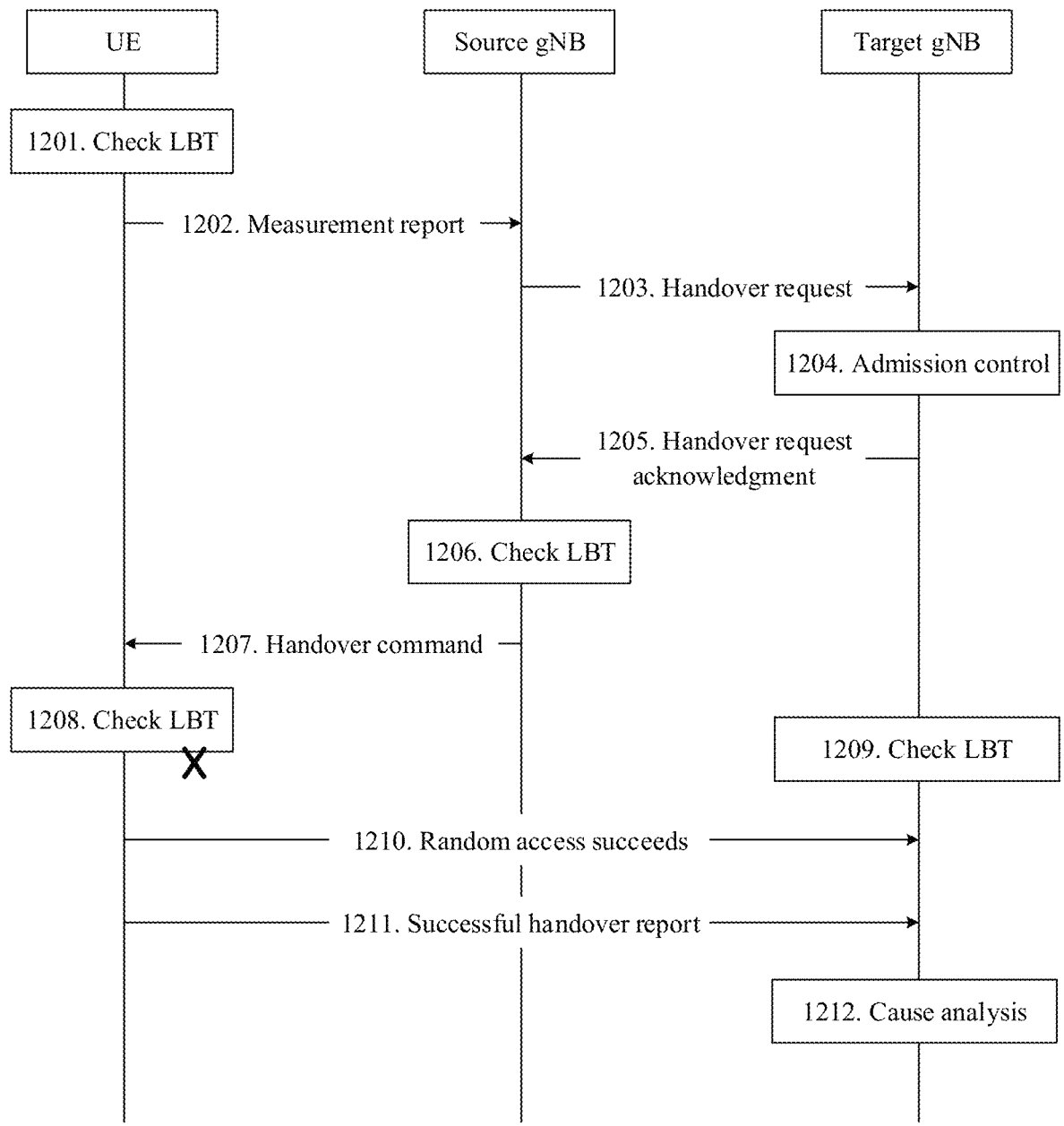
FIG. 12B is a schematic flowchart of another communication method according to an embodiment of this application.

For example, step 1211 in FIG. 12B may be a specific example of step 1240*a*. For details, refer to the following description of step 1211 in FIG. 12B. Details are not described herein. Indication information #4 may be a specific example of the second indication information.

1250*a*. The target gNB determines a cause for a mobility problem. For example, the target gNB determines, based on the second indication information, the cause for the mobility problem arising from handover of the UE from a source gNB to the target gNB, that is, a mobility problem caused by a large random access delay due to LBT.

In an example, step 1212 in FIG. 12B may be a specific example of step 1250*a*. For details, refer to the following description of step 1212 in FIG. 12B. Details are not described herein.

Therefore, in this embodiment of this application, in a case that the UE performs unsuccessful LBT for channel detection on the unlicensed channel but finally performs successful LBT, the random access delay is large although the UE successfully performs random access to the target gNB. In this case, the UE may send, to the target gNB, indication information indicating unsuccessful LBT, so that the target gNB can perform cause analysis for the mobility problem based on the indication information. Therefore, in this embodiment of this application, the mobility problem arising from unsuccessful LBT can be identified and distinguished from a conventional mobility problem, and further the mobility problem is resolved by adjusting a corresponding parameter.

FIG. 12B is a schematic flowchart of another communication method from a perspective of device interaction. In the method, when performing random access to a target gNB, the UE performs successful LBT for channel detection on an unlicensed channel. However, the UE has performed unsuccessful LBT for channel detection. In other words, in the method, the UE finally successfully accesses the target gNB. As shown in FIG. 12B, the method includes step 1201 to step 1211.

1201. The UE checks LBT (check LBT) on the unlicensed channel.

1202. The UE sends a measurement report to a source gNB.

1203. The source gNB sends a handover request to the target gNB. Accordingly, the target gNB receives the handover request.

1204. The target gNB performs admission control on the UE based on the handover request.

1205. The target gNB sends a handover request acknowledgment (ACK) to the source gNB.

1206. The source gNB checks LBT on the unlicensed channel.

1207. The source gNB sends a handover command to the UE.

Specifically, for step 1101 to step 1107, refer to descriptions of step 901 to step 907 in FIG. 9. For brevity, details are not described herein again.

1208. The UE checks LBT on the unlicensed channel in a random access procedure. Herein, the UE performs successful LBT for channel detection on the unlicensed channel. However, the UE has performed unsuccessful LBT for channel detection.

For example, the UE has performed unsuccessful LBT for channel detection on a first unlicensed channel (which means that the first unlicensed channel cannot be used by the UE to send data). However, the UE performs successful LBT for channel detection on a second unlicensed channel (which means that the second unlicensed channel can be used by the UE to send data).

In some embodiments, after receiving the handover command sent by the source gNB, the UE checks LBT on the first unlicensed channel, and performs unsuccessful LBT for channel detection on the first unlicensed channel. Subsequently, the UE continues to check LBT on the second unlicensed channel, and performs successful LBT for channel detection on the second unlicensed channel. In this case, the second unlicensed channel can be used by the UE to send a random access request (that is, an msg1) to the target gNB. In other words, the UE obtains, on the second unlicensed channel, an unlicensed resource for sending the random access request. Subsequently, the UE successfully sends, on the second unlicensed channel, the random access request to the target gNB.

In some embodiments, after receiving an msg2 sent by the target gNB, the UE may check LBT on the first unlicensed channel, and performs unsuccessful LBT for channel detection on the first unlicensed channel. Subsequently, the UE continues to check LBT on the second unlicensed channel, and performs successful LBT for channel detection on the second unlicensed channel. In this case, the second unlicensed channel can be used by the UE to send an msg3 to the target gNB. In other words, the UE obtains, on the second unlicensed channel, an unlicensed resource for sending the msg3. Subsequently, the UE successfully sends, on the second unlicensed channel, the msg3 to the target gNB.

It should be noted that in a case that the UE has performed unsuccessful LBT for channel detection on the unlicensed channel but finally performs successful LBT on the unlicensed channel, a delay in the random access procedure is increased although the random access procedure between the UE and the target gNB is successful, resulting in a mobility problem.

1209. In the random access procedure, the target gNB checks LBT on the unlicensed channel, and performs successful LBT for channel detection on the unlicensed channel, and the target gNB successfully sends the msg2 and an msg4 to the UE.

In some embodiments, after receiving the random access request sent by the UE, the target gNB may check LBT on the unlicensed channel, and send the msg2 to the UE through the unlicensed channel in a case of performing successful LBT for channel detection on the unlicensed channel. Subsequently, the target gNB receives the msg3 sent by the UE, checks LBT on the unlicensed channel, and sends the msg4 to the UE through the unlicensed channel in a case of performing successful LBT for channel detection on the unlicensed signal.

1210. Random access succeeds.

1211. The UE sends a successful handover report to the target gNB. The successful handover report indicates that the UE is successfully handed over to the target gNB. The successful handover report includes indication information #4. The indication information #4 indicates that UE performs unsuccessful LBT for channel detection on an unlicensed channel. In some embodiments, the indication information #4 may further indicate that the UE performs unsuccessful LBT for channel detection on the first unlicensed channel before performing channel detection on the second unlicensed channel and performing successful LBT.

In an example, the indication information #4 may include at least one of an identifier (ID) of the UE, an identifier of a cell on which unsuccessful LBT is performed, a probability that UE performs unsuccessful LBT in the cell on which unsuccessful LBT is performed, a quantity of times that the UE performs unsuccessful LBT in the cell on which unsuccessful LBT is performed, and the like.

Optionally, the UE may directly send the indication information #4 to the target gNB, or include the indication information #4 in another message or signaling. This is not limited in this embodiment of this application.

In some optional embodiments, the successful handover report further includes at least one of the following:
 a period of time from a moment at which the UE starts to perform channel detection on the first unlicensed channel to a moment at which the UE performs successful LBT on the second unlicensed channel;
 information about a moment at which the UE performs unsuccessful LBT on the first unlicensed channel;
 a period of time from a moment at which the UE receives a handover command to a moment at which the UE starts to check LBT on the first unlicensed channel;
 a period of time from a moment at which the UE receives a handover command to a moment at which the UE performs unsuccessful LBT;
 a period of time from a moment at which the UE starts to check LBT on the first unlicensed channel to a moment at which the UE performs unsuccessful LBT;
 a period of time from a moment at which the UE performs unsuccessful LBT to a moment at which the UE performs successful LBT;
 a quantity of times of performing unsuccessful LBT during a period of time from a moment at which the UE starts to perform channel detection on the first unlicensed channel to a moment at which the UE performs successful LBT on the second unlicensed channel; and channel occupation information.

In addition, the successful handover report may further include content included in an existing successful handover report. The successful handover report may be sent in an RRC reconfiguration complete message of the UE. For details, refer to descriptions in the current technology (3GPP TS 37.816). Details are not described herein.

1212. After receiving the successful handover report, the target gNB may perform cause analysis based on the successful handover report. In an example, the source gNB may determine, based on the indication information #4 in the successful handover report, that a mobility problem (for example, a handover delay is relatively large) is caused because the UE performs unsuccessful LBT for channel detection on the unlicensed channel in a handover process. In this case, a corresponding parameter of the UE on the unlicensed channel may be adjusted.

Therefore, in this embodiment of this application, in a scenario in which the UE is handed over from the source gNB to the target gNB, in a case that the UE performs unsuccessful LBT for channel detection on the unlicensed channel but finally performs successful LBT, a random access delay is large although the UE successfully performs random access to the target gNB. In this case, the UE may send, to the target gNB, indication information indicating unsuccessful LBT, so that the target gNB can perform cause analysis for the mobility problem based on the indication information. Therefore, in this embodiment of this application, the mobility problem arising from unsuccessful LBT can be identified and distinguished from a conventional mobility problem, and further the mobility problem is resolved by adjusting a corresponding parameter.

Figure 13:
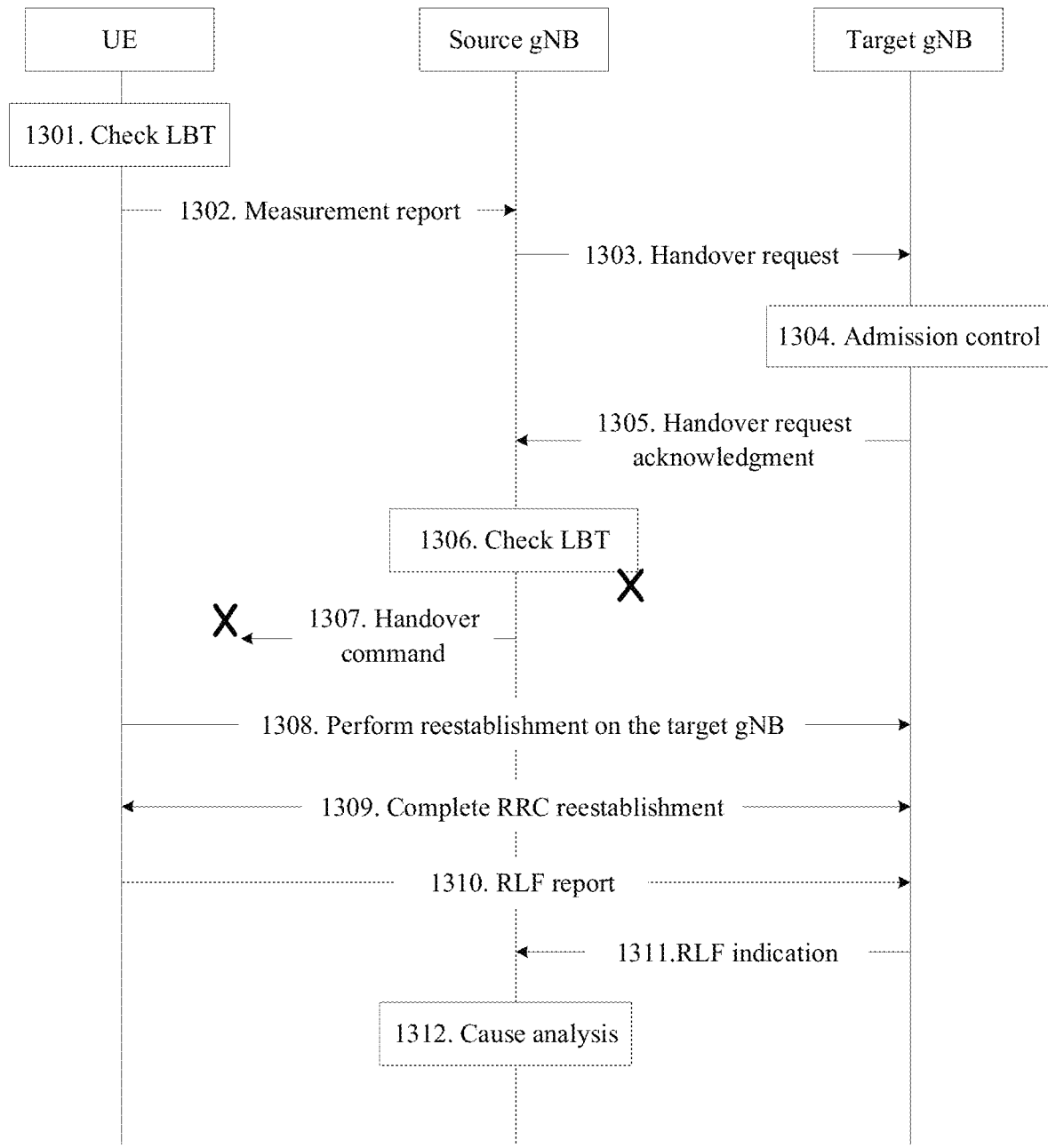
FIG. 13 is a schematic flowchart of another communication method according to an embodiment of this application.

FIG. 13 is a schematic flowchart of another communication method from a perspective of device interaction. In the method, a source gNB performs unsuccessful LBT for channel detection on an unlicensed channel, and consequently, a handover command fails to be sent. As shown in FIG. 13, the method includes step 1301 to step 1312.

1301. UE checks LBT (check LBT) on the unlicensed channel.

1302. The UE sends a measurement report to the source gNB.

1303. The source gNB sends a handover request to a target gNB. Accordingly, the target gNB receives the handover request.

1304. The target gNB performs admission control on the UE based on the handover request.

1305. The target gNB sends a handover request acknowledgment (ACK) to the source gNB.

Specifically, for step 1301 to step 1305, refer to descriptions of step 901 to step 905 in FIG. 9. For brevity, details are not described herein again.

1306. The source gNB checks LBT on the unlicensed channel, and performs unsuccessful LBT for channel detection on the unlicensed channel (which means that the unlicensed channel cannot be used by the source gNB to send data).

In an example, after receiving the handover request acknowledgment sent by the target gNB, the source gNB checks LBT on the unlicensed channel, and performs unsuccessful LBT for channel detection on the unlicensed channel. In this case, the unlicensed channel cannot be used by the source gNB to send a handover command to the UE.

1307. The source gNB fails to send the handover command to the UE.

Specifically, because the source gNB cannot obtain an unlicensed resource for sending the handover command, that is, the source gNB performs unsuccessful LBT when attempting to send, on the unlicensed channel, the handover command to the UE, and consequently, the handover command fails.

1308. Perform reestablishment on the target gNB.

Specifically, the UE experiences a radio link failure and performs reestablishment to the target gNB.

1309. Complete an RRC reestablishment process between the UE and the target gNB.

1310. The UE sends an RLF report to the target gNB.

1311. The target gNB sends an RLF indication to the source gNB. Accordingly, the source gNB receives the RLF indication.

Specifically, for step 1309 to step 1311, refer to descriptions in the current technology. Details are not described herein.

1312. After receiving the RLF indication, the source gNB may perform cause analysis for a handover failure based on the RLF indication. In this case, the source gNB may perform cause analysis for the handover failure based on the RLF indication and an unsuccessful LBT status of the source gNB.

In an example, the source gNB may determine, based on the unsuccessful LBT status of the source gNB, that the source gNB performs unsuccessful LBT for channel detection on the unlicensed channel in a handover process, and consequently, the handover command fails to be sent, and a mobility problem is caused. In this case, a corresponding parameter on the unlicensed channel may be adjusted.

Therefore, in this embodiment of this application, in a scenario in which the UE is handed over from the source gNB to the target gNB, when the source gNB fails to send the handover command to the UE because the source gNB perform unsuccessful LBT for channel detection on the unlicensed channel, the gNB may perform cause analysis for the handover failure based on the unsuccessful LBT status of the source gNB. Therefore, in this embodiment of this application, the mobility problem arising from unsuccessful LBT can be identified and distinguished from a conventional mobility problem, and further the mobility problem is resolved by adjusting a corresponding parameter.

Figure 14A:
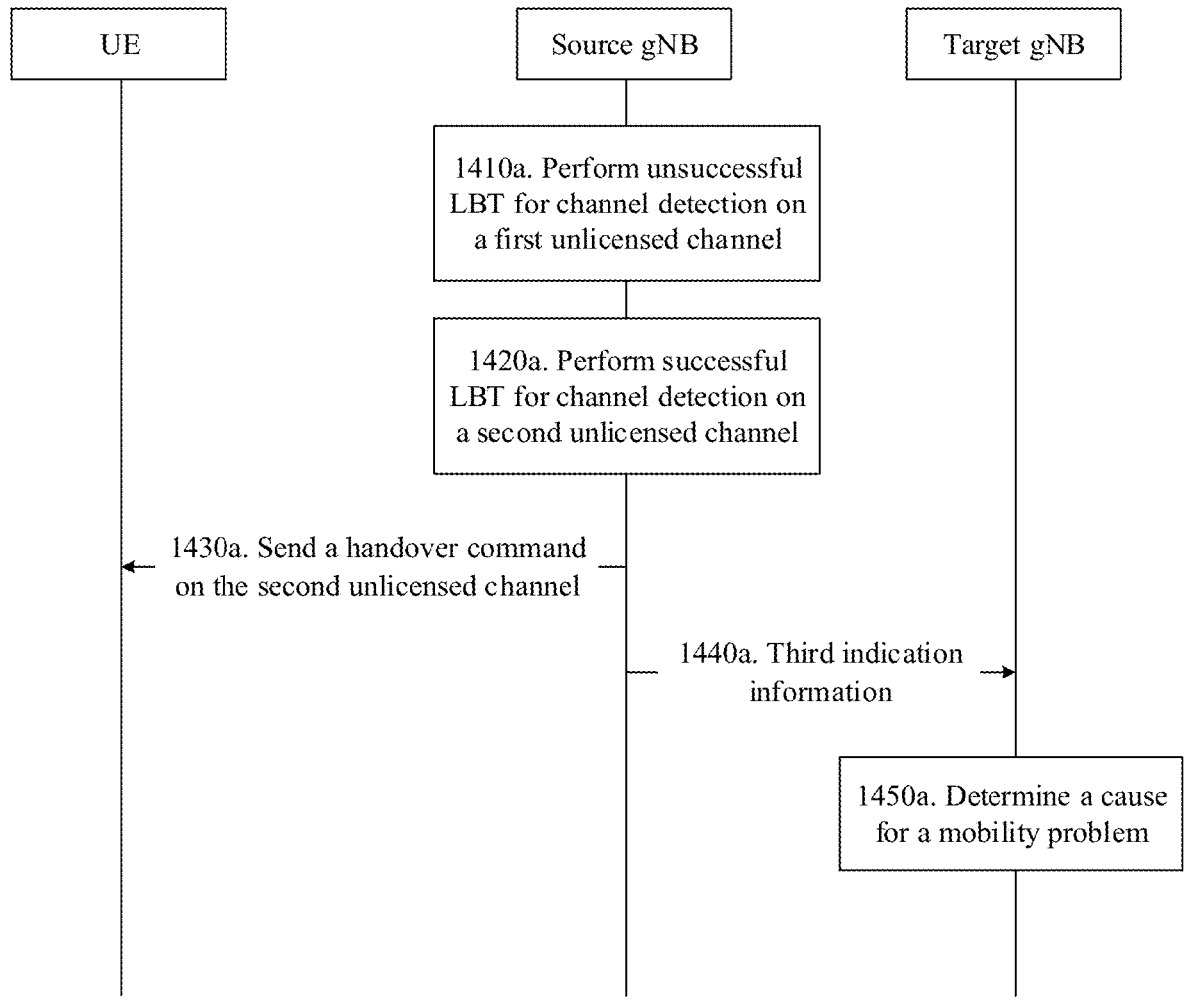
FIG. 14A is a schematic flowchart of another communication method according to an embodiment of this application.

FIG. 14A is a schematic flowchart of another communication method from a perspective of device interaction. In the method, a source gNB performs successful LBT for channel detection on an unlicensed channel. However, the source gNB has performed unsuccessful LBT for channel detection. In other words, in the method, the source gNB finally successfully sends a handover command to UE, and the UE successfully accesses a target gNB. As shown in FIG. 14A, the method includes step 1410*a* to step 1450*a*.

1410*a*. The source gNB performs unsuccessful LBT for channel detection on a first unlicensed channel.

1420*a*. The source gNB performs successful LBT for channel detection on a second unlicensed channel.

1430*a*. The source gNB sends, on the second unlicensed channel, a handover command to the UE. Accordingly, the UE receives the handover command sent by the source gNB.

In other words, the source gNB performs successful LBT for channel detection on the unlicensed channel, and sends, on the unlicensed channel on which successful LBT is performed, the handover command to the UE. Finally, the UE successfully performs random access to the target gNB. However, the source gNB has performed unsuccessful LBT for channel detection. For example, step 1406 in FIG. 14B may be a specific example of step 1410*a* and step 1420*b*, and step 1407 may be a specific example of step 1430a. For details, refer to the following description of step 1407 in FIG. 14B. Details are not described herein.

1440a. The source gNB sends third indication information to the target gNB. The third indication information indicates that the source gNB performs unsuccessful LBT for channel detection on the first unlicensed channel before performing channel detection on the second unlicensed channel and performing successful LBT.

Accordingly, the target gNB receives the third indication information sent by the source gNB.

Figure 14B:
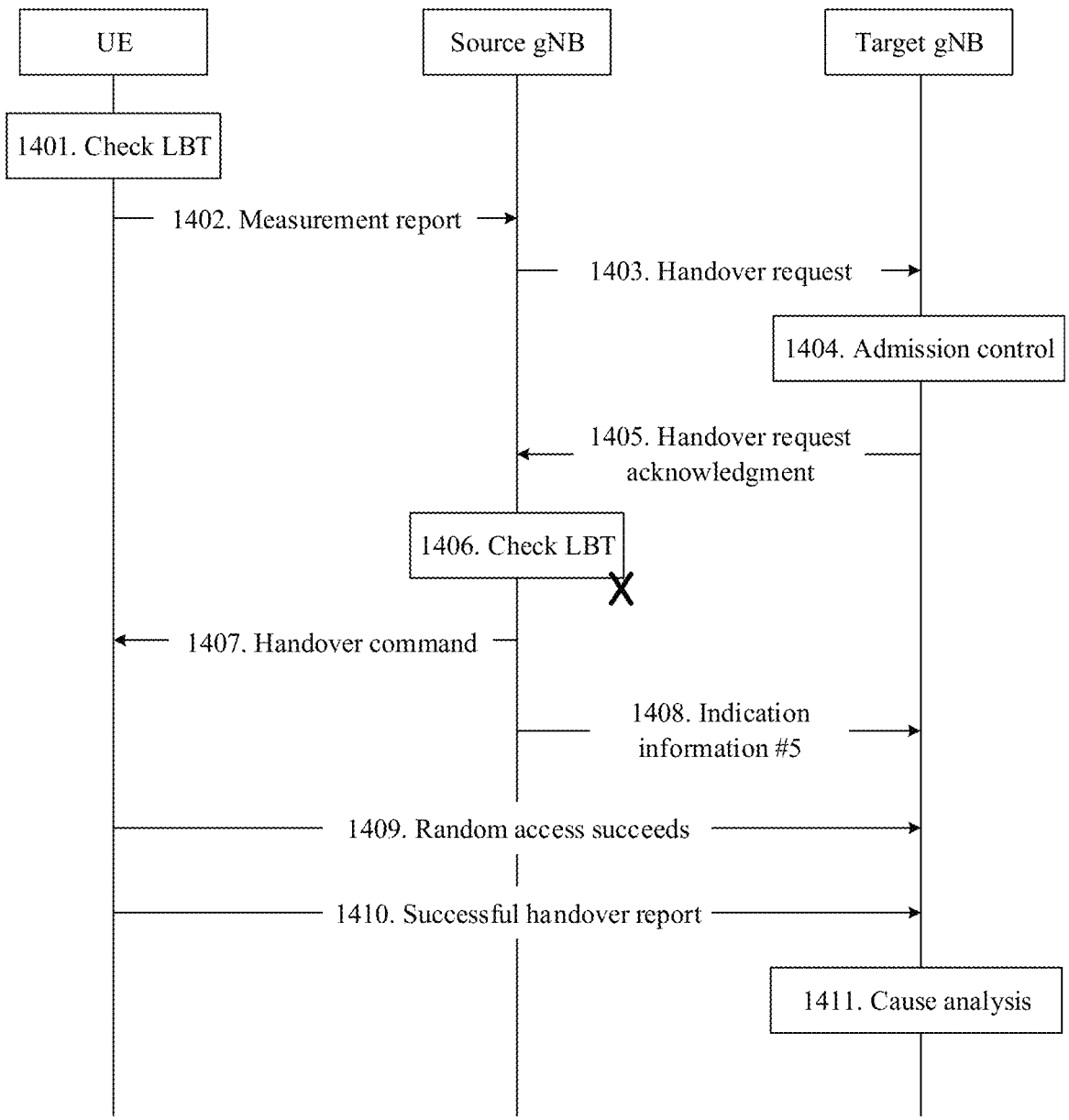
FIG. 14B is a schematic flowchart of another communication method according to an embodiment of this application.

For example, step 1408 in FIG. 14B may be a specific example of step 1440a. For details, refer to the following description of step 1408 in FIG. 14B. Details are not described herein. Indication information #5 may be a specific example of the third indication information.

1450a. The target gNB determines a cause for a mobility problem. For example, the target gNB determines, based on the third indication information, the cause for the mobility problem arising from handover of the UE from the source gNB to the target gNB, that is, a mobility problem caused by a relatively large random access delay due to LBT.

In an example, step 1411 in FIG. 14B may be a specific example of step 1450a. For details, refer to the following description of step 1411 in FIG. 14B. Details are not described herein.

Therefore, in this embodiment of this application, in a case that the source gNB performs unsuccessful LBT for channel detection on the unlicensed channel but finally performs successful LBT, a delay in a handover process is large although the source gNB successfully sends the handover command. In this case, the source gNB may send, to the target gNB, indication information indicating unsuccessful LBT, for cause analysis for the mobility problem. Therefore, in this embodiment of this application, the mobility problem arising from unsuccessful LBT can be identified and distinguished from a conventional mobility problem, and further the mobility problem is resolved by adjusting a corresponding parameter.

FIG. 14B is a schematic flowchart of another communication method from a perspective of device interaction. In the method, a source gNB performs successful LBT for channel detection on an unlicensed channel. However, the source gNB has performed unsuccessful LBT for channel detection. In other words, in the method, the source gNB finally successfully sends a handover command to UE, and the UE successfully accesses a target gNB. As shown in FIG. 14B, the method includes step 1401 to step 1411.

1401. UE checks LBT (check LBT) on the unlicensed channel.

1402. The UE sends a measurement report to the source gNB.

1403. The source gNB sends a handover request to the target gNB. Accordingly, the target gNB receives the handover request.

1404. The target gNB performs admission control on the UE based on the handover request.

1405. The target gNB sends a handover request acknowledgment (ACK) to the source gNB.

Specifically, for step 1401 to step 1405, refer to descriptions of step 901 to step 905 in FIG. 9. For brevity, details are not described herein again.

1406. The source gNB prepares to send a handover command message to the UE, and checks LBT on the unlicensed channel when sending the handover command. Herein, the source gNB performs successful LBT for channel detection on the unlicensed channel. However, the source gNB has performed unsuccessful LBT for channel detection.

For example, the source gNB performs unsuccessful LBT for channel detection on a first unlicensed channel (which means that the first unlicensed channel cannot be used by the source gNB to send data). However, the source gNB performs successful LBT for channel detection on a second unlicensed channel (which means that the second unlicensed channel can be used by the source gNB to send data).

In a specific example, after receiving the handover request acknowledgment sent by the target gNB, the source gNB checks LBT on the first unlicensed channel, and performs unsuccessful LBT for channel detection on the first unlicensed channel. Subsequently, the source gNB continues to check LBT on the second unlicensed channel, and performs successful LBT for channel detection on the second unlicensed channel. In this case, the second unlicensed channel can be used by the source gNB to send the handover command to the UE. In other words the source gNB obtains an unlicensed resource for sending the handover command to the UE.

1407. The source gNB sends the handover command to the UE.

For example, the source gNB obtains, on the second unlicensed channel, the unlicensed resource for sending the handover command. Subsequently, the source gNB successfully sends, on the second unlicensed channel, the handover command to the UE.

It should be noted that in a case that the source gNB has performed unsuccessful LBT for channel detection on the unlicensed channel but finally performs successful LBT on the unlicensed channel, a delay in sending the handover command by the source gNB to the UE increases although the UE successfully receives the handover command. Accordingly, a delay in a handover process also increases, potentially resulting in a mobility problem.

1408. The source gNB sends indication information #5 to the target gNB, where the indication information #5 indicates that unsuccessful LBT is performed on the unlicensed channel. Accordingly, the source gNB receives the indication information #5. In some embodiments, the indication information #5 may further indicate that the source gNB performs unsuccessful LBT for channel detection on the first unlicensed channel before performing channel detection on the second unlicensed channel and performing successful LBT.

In an example, the indication information #5 may include at least one of an identifier (ID) of the UE, an identifier of a cell on which unsuccessful LBT is performed, a probability that the target gNB performs unsuccessful LBT in the cell on which unsuccessful LBT is performed, and the like.

Optionally, the indication information #5 may further include at least one of the following information:

a period of time from a moment at which the source gNB starts to check LBT on the unlicensed channel to a moment at which the source gNB performs unsuccessful LBT;

a period of time from a moment at which the source gNB performs unsuccessful LBT on the unlicensed channel to a moment at which the source gNB successfully sends a handover command;

information about a moment (for example, a timestamp) at which the source gNB performs unsuccessful LBT on the unlicensed channel;

a quantity of times of performing unsuccessful LBT during a period of time from a moment at which the source gNB starts to perform LBT on the unlicensed channel to a moment at which the source gNB performs successful LBT on the unlicensed channel; and channel occupation information.

It should be noted that a sending occasion of the indication information #5 is not limited in this embodiment of this application. In other words, in this embodiment of this application, a sequential relationship among sending of the indication information #5, performing of a random access procedure, reporting of a successful handover report, and the like is not limited.

1409. The UE successfully performs random access (random access success) to the target gNB.

It may be understood that a random access message between the UE and the target gNB is successfully sent on the unlicensed channel.

1410. The UE sends a successful handover report to the target gNB.

In some embodiments, the successful handover report may be carried in an existing RRC message of the UE for sending, for example, an RRC reconfiguration complete message. This is not limited in this embodiment of this application. Optionally, the successful handover report may further include related information of radio link monitoring (RLM).

It should be noted that step 1402 is optional.

For content included in the successful handover report, refer to descriptions in the current technology (3GPP TS 37.816). Details are not described herein again.

1411. The target gNB may perform cause analysis based on the indication information #5 and/or the successful handover report. In an example, the target gNB may determine, based on the indication information #5, that the gNB has performed unsuccessful LBT for channel detection on the unlicensed channel. As a result, a delay in sending the handover command is excessively large, causing a mobility problem (for example, a relatively large handover delay).

Optionally, after determining that the problem is related to LBT configuration of the source gNB, the target gNB may send indication information #6 to the source gNB, for the source gNB to adjust LBT-related configuration. In a possible implementation, the indication information #6 may be sent to the source gNB via a handover success indication.

Therefore, in this embodiment of this application, in a scenario in which the UE is handed over from the source gNB to the target gNB, in a case that the source gNB performs unsuccessful LBT for channel detection on the unlicensed channel but finally performs successful LBT, a delay in the handover process is large although the source gNB successfully sends the handover command. In this case, the source gNB may send, to the target gNB, indication information indicating unsuccessful LBT, for cause analysis for the mobility problem. Therefore, in this embodiment of this application, the mobility problem arising from unsuccessful LBT can be identified and distinguished from a conventional mobility problem, and further the mobility problem is resolved by adjusting a corresponding parameter.

It may be understood that, in the foregoing embodiments of this application, the method implemented by the access network device may alternatively be implemented by a component (for example, a chip or a circuit) that can be used in the access network device, and the method implemented by the terminal device may alternatively be implemented by a component (for example, a chip or a circuit) that can be used in the terminal device.

Figure 15:
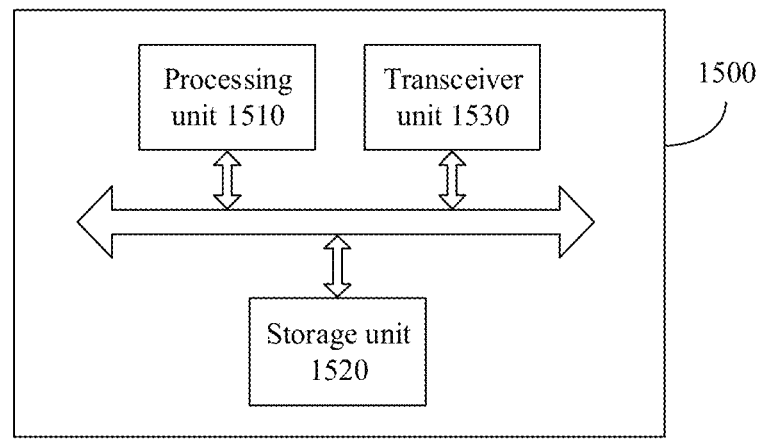
FIG. 15 is a schematic diagram of a wireless communication apparatus according to an embodiment of this application.

According to the foregoing methods, FIG. 15 is a schematic diagram of a wireless communication apparatus 1500 according to an embodiment of this application.

In some embodiments, the apparatus 1500 may be a first access network device, or may be a chip or a circuit, for example, a chip or a circuit that may be deployed in the first access network device. In some embodiments, the apparatus 1500 may be a second access network device, or may be a chip or a circuit, for example, a chip or a circuit that may be deployed in the second access network device. In some embodiments, the apparatus 1500 may be a terminal device, or may be a chip or a circuit, for example, a chip or a circuit that may be deployed in the terminal device.

The apparatus 1500 may include a processing unit 1510 (an example of a processor) and a transceiver unit 1530.

Optionally, the transceiver unit 1530 may be implemented using a transceiver, a transceiver-related circuit, or an interface circuit.

Optionally, the apparatus may further include a storage unit 1520. In a possible manner, the storage unit 1520 is configured to store instructions. Optionally, the storage unit may alternatively be configured to store data or information. The storage unit 1520 may be implemented using a memory.

In a possible design, the processing unit 1510 may be configured to execute the instructions stored in the storage unit 1520, to enable the apparatus 1500 to implement the steps performed by the first access network device in the foregoing method.

Further, the processing unit 1510, the storage unit 1520, and the transceiver unit 1530 may communicate with each other through an internal connection path for transmission of control signals and/or data signals. For example, the storage unit 1520 is configured to store a computer program. The processing unit 1510 may be configured to invoke the computer program from the storage unit 1520 and run the computer program, to control the transceiver unit 1530 to receive a signal and/or send a signal, to complete the steps of the first access network device in the foregoing method.

In a possible design, the processing unit 1510 may be configured to execute the instructions stored in the storage unit 1520, to enable the apparatus 1500 to implement the steps performed by the second access network device in the foregoing method.

Further, the processing unit 1510, the storage unit 1520, and the transceiver unit 1530 may communicate with each other through an internal connection path for transmission of control signals and/or data signals. For example, the storage unit 1520 is configured to store a computer program. The processing unit 1510 may be configured to invoke the computer program from the storage unit 1520 and run the computer program, to control the transceiver unit 1530 to receive a signal and/or send a signal, to complete the steps of the second access network device in the foregoing method.

In a possible design, the processing unit 1510 may be configured to execute the instructions stored in the storage unit 1520, to enable the apparatus 1500 to implement the steps performed by the terminal device in the foregoing method.

Further, the processing unit 1510, the storage unit 1520, and the transceiver unit 1530 may communicate with each other through an internal connection path for transmission of control signals and/or data signals. For example, the storage unit 1520 is configured to store a computer program. The processing unit 1510 may be configured to invoke the computer program from the storage unit 1520 and run the computer program, to control the transceiver unit 1530 to receive a signal and/or send a signal, to complete the steps of the terminal device in the foregoing method.

The storage unit 1520 may be integrated into the processing unit 1510, or may be deployed separately from the processing unit 1510.

Optionally, if the apparatus 1500 is a communication device, the transceiver unit 1530 may include a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 1500 is the chip or the circuit, the transceiver unit 1530 may include an input interface and an output interface.

In an implementation, a function of the transceiver unit 1530 may be considered to be implemented using a transceiver circuit or a transceiver-dedicated chip. It may be considered that the processing unit 1510 is implemented using a dedicated processing chip, a processing circuit, a processing unit, or a general-purpose chip.

In another implementation, it may be considered that the communication device (for example, the first access network device, the second access network device, or the terminal device) provided in embodiments of this application is implemented using a general-purpose computer. That is, program code for implementing functions of the processing unit 1510 and the transceiver unit 1530 is stored in the storage unit 1520, and the general-purpose processing unit implements the functions of the processing unit 1510 and the transceiver unit 1530 by executing the code in the storage unit 1520.

In some embodiments, when the apparatus 1500 is the first access network device or the chip or the circuit deployed in the first access network device, the transceiver unit 1530 is configured to receive a random access request sent by a terminal device. The processing unit 1510 is configured to perform unsuccessful listen before talk (LBT) for channel detection on an unlicensed channel.

The transceiver unit 1530 is further configured to send first indication information to a second access network device, where the first indication information indicates that the first access network device performs unsuccessful LBT for channel detection on the unlicensed channel.

Optionally, before the processing unit 1510 performs unsuccessful listen before talk (LBT) for channel detection on the unlicensed channel, the transceiver unit 1530 is further configured to receive a handover request from the second access network device, where the handover request requests the terminal device to hand over from the second access network device to the first access network device.

In response to the handover request, the transceiver unit 1530 is further configured to send a handover response to the second access network device, and the processing unit 1510 is further configured to start a timer corresponding to the terminal device, where the timer is used by the first access network device to identify the terminal device.

Optionally, before the processing unit 1510 performs unsuccessful listen before talk (LBT) for channel detection on the unlicensed channel, the transceiver unit 1530 is further configured to receive fourth indication information from the second access network device, where the fourth indication information indicates the first access network device to start the timer corresponding to the terminal device, and the timer is used by the first access network device to identify the terminal device.

The processing unit 1510 is further configured to start the timer based on the fourth indication information.

Optionally, the first indication information includes at least one of an identifier of the terminal device, an identifier of a cell on which unsuccessful LBT is performed, and a probability of unsuccessful LBT.

In some embodiments, when the apparatus 1500 is the second access network device or the chip or the circuit deployed in the second access network device, the transceiver unit 1530 is configured to receive first indication information sent by a first access network device, where the first indication information indicates that the first access network device performs unsuccessful listen before talk (LBT) for channel detection on an unlicensed channel.

The processing unit 1510 is configured to determine, based on the first indication information, a cause for a mobility problem arising from handover of a terminal device from the second access network device to the first access network device.

Optionally, before the transceiver unit 1530 receives the first indication information sent by the first access network device, the transceiver unit 1530 is further configured to send fourth indication information to the first access network device, where the fourth indication information indicates the first access network device to start a timer corresponding to the terminal device, and the timer is used by the first access network device to identify the terminal device.

Optionally, the first indication information includes at least one of an identifier of the terminal device, an identifier of a cell on which unsuccessful LBT is performed, and a probability of unsuccessful LBT.

In some embodiments, when the apparatus 1500 is the terminal device or the chip or the circuit deployed in the terminal device, the processing unit 1510 is configured to perform unsuccessful listen before talk (LBT) for channel detection on a first unlicensed channel, and perform successful LBT for channel detection on a second unlicensed channel.

The transceiver unit 1530 is configured to send, on the second unlicensed channel, a request message to a first access network device.

The transceiver unit 1530 is further configured to send second indication information to the first access network device, where the second indication information indicates that the terminal device performs unsuccessful LBT for channel detection on the first unlicensed channel before performing channel detection on the second unlicensed channel and performing successful LBT.

Optionally, the transceiver unit 1530 is specifically configured to send a successful handover report to the first access network device, where the successful handover report indicates that the terminal device is successfully handed over to the first access network device, and the successful handover report includes the second indication information.

Optionally, the successful handover report further includes at least one of the following:

a period of time from a moment at which channel detection starts to be performed on the first unlicensed channel to a moment at which successful LBT is performed on the second unlicensed channel;

information about a moment at which unsuccessful LBT is performed on the first unlicensed channel;

a period of time from a moment at which a handover command is received to a moment at which LBT starts to be checked on the first unlicensed channel;

a period of time from a moment at which a handover command is received to a moment at which unsuccessful LBT is performed on the first unlicensed channel;

a period of time from a moment at which LBT starts to be checked on the first unlicensed channel to a moment at which unsuccessful LBT is performed;

a period of time from a moment at which unsuccessful LBT is performed to a moment at which successful LBT is performed;

a quantity of times of performing unsuccessful LBT during a period of time from a moment at which channel detection starts to be performed on the first unlicensed channel to a moment at which successful LBT is performed on the second unlicensed channel; and channel occupation information.

Optionally, the second indication information includes at least one of an identifier of the terminal device, an identifier of a cell on which unsuccessful LBT is performed, and a probability of unsuccessful LBT.

Optionally, the request message includes a message 1 or a message 3 in a random access procedure.

In some embodiments, when the apparatus 1500 is the first access network device or the chip or the circuit deployed in the first access network device, the transceiver unit 1530 is configured to receive a request message sent on the second unlicensed channel by the terminal device.

The transceiver unit 1530 is further configured to receive second indication information sent by the terminal device, where the second indication information indicates that the terminal device performs unsuccessful listen before talk (LBT) for channel detection on a first unlicensed channel before performing channel detection on the second unlicensed channel and performing successful LBT.

The processing unit 1510 is configured to determine, based on the second indication information, a cause for a mobility problem arising from handover of the terminal device from the second access network device to the first access network device.

Optionally, the transceiver unit 1530 is specifically configured to receive a successful handover report sent by the terminal device, where the successful handover report indicates that the terminal device is successfully handed over to the first access network device, and the successful handover report includes the second indication information.

Optionally, the successful handover report further includes at least one of the following:

a period of time from a moment at which the terminal device starts to perform channel detection on the first unlicensed channel to a moment at which the terminal device performs successful LBT on the second unlicensed channel;

information about a moment at which the terminal device performs unsuccessful LBT on the first unlicensed channel;

a period of time from a moment at which the terminal device receives a handover command to a moment at which the terminal device starts to check LBT on the first unlicensed channel;

a period of time from a moment at which the terminal device receives a handover command to a moment at which the terminal device performs unsuccessful LBT on the first unlicensed channel;

a period of time from a moment at which the terminal device starts to check LBT on the first unlicensed channel to a moment at which the terminal device performs unsuccessful LBT;

a period of time from a moment at which the terminal device performs unsuccessful LBT to a moment at which the terminal device performs successful LBT;

a quantity of times of performing unsuccessful LBT during a period of time from a moment at which the terminal device starts to perform channel detection on the first unlicensed channel to a moment at which the terminal device performs successful LBT on the second unlicensed channel; and channel occupation information.

Optionally, the second indication information includes at least one of an identifier of the terminal device, an identifier of a cell on which unsuccessful LBT is performed, and a probability of unsuccessful LBT.

Optionally, the request message includes a message 1 or a message 3 in a random access procedure.

In some embodiments, when the apparatus 1500 is the second access network device or the chip or the circuit deployed in the second access network device, the processing unit 1510 is configured to perform unsuccessful listen before talk (LBT) for channel detection on a first unlicensed channel, and then perform successful LBT for channel detection on a second unlicensed channel.

The transceiver unit 1530 is configured to send, on the second unlicensed channel, a handover command to a terminal device.

The transceiver unit 1530 is further configured to send third indication information to the first access network device, where the third indication information indicates that the terminal device performs unsuccessful LBT for channel detection on the first unlicensed channel before performing channel detection on the second unlicensed channel and performing successful LBT.

Optionally, the third indication information includes:

a period of time from a moment at which channel detection starts to be performed on the first unlicensed channel to a moment at which successful LBT is performed on the second unlicensed channel;

information about a moment at which unsuccessful LBT is performed on the first unlicensed channel;

a period of time from a moment at which LBT starts to be checked on the first unlicensed channel to a moment at which unsuccessful LBT is performed;

a period of time from a moment at which unsuccessful LBT is performed to a moment at which a handover command is successfully sent;

a quantity of times of performing unsuccessful LBT during a period of time from a moment at which channel detection starts to be performed on the first unlicensed channel to a moment at which successful LBT is performed on the second unlicensed channel; and channel occupation information.

Optionally, the third indication information includes at least one of an identifier of the terminal device, an identifier of a cell on which unsuccessful LBT is performed, and a probability of unsuccessful LBT.

In some embodiments, when the apparatus 1500 is the first access network device or the chip or the circuit deployed in the first access network device, the transceiver unit 1530 is configured to receive third indication information from a second access network device, where the third indication information indicates that a terminal device performs unsuccessful listen before talk (LBT) for channel detection on a first unlicensed channel before performing channel detection on a second unlicensed channel and performing successful LBT.

The processing unit 1510 is configured to determine, based on the third indication information, a cause for a mobility problem arising from handover of the terminal device from the second access network device to the first access network device.

Optionally, the third indication information includes:

a period of time from a moment at which the second access network device starts to perform channel detection on the first unlicensed channel to a moment at which the second access network device performs successful LBT on the second unlicensed channel;

information about a moment at which the second access network device performs unsuccessful LBT on the first unlicensed channel;

a period of time from a moment at which the second access network device starts to check LBT on the first unlicensed channel to a moment at which the second access network device performs unsuccessful LBT;

a period of time from a moment at which the second access network device performs unsuccessful LBT to a moment at which the second access network device successfully sends a handover command;

a quantity of times of performing unsuccessful LBT during a period of time from a moment at which the second access network device starts to perform channel detection on the first unlicensed channel to a moment at which the second access network device performs successful LBT on the second unlicensed channel; and channel occupation information.

Optionally, the third indication information includes at least one of an identifier of the terminal device, an identifier of a cell on which unsuccessful LBT is performed, and a probability of unsuccessful LBT.

The units in the foregoing embodiment may also be referred to as modules, circuits, or components.

Functions and actions of the modules or units in the apparatus 1500 listed above are merely examples for description. When the apparatus 1500 is configured in or is the first access network device, the modules or the units in the apparatus 1500 may be configured to perform the actions or processing processes performed by the first access network device in the foregoing method. When the apparatus 1500 is configured in or is the second access network device, the modules or the units in the apparatus 1500 may be configured to perform the actions or processing processes performed by the second access network device in the foregoing method. When the apparatus 1500 is configured in or is the terminal device, the modules or the units in the apparatus 1500 may be configured to perform the actions or processing processes performed by the terminal device in the foregoing method.

For concepts, explanations, detailed descriptions, and other steps of the apparatus 1500 that are related to the technical solutions provided in embodiments of this application, refer to the descriptions of the content in the foregoing methods or other embodiments. Details are not described herein again.

Figure 16:
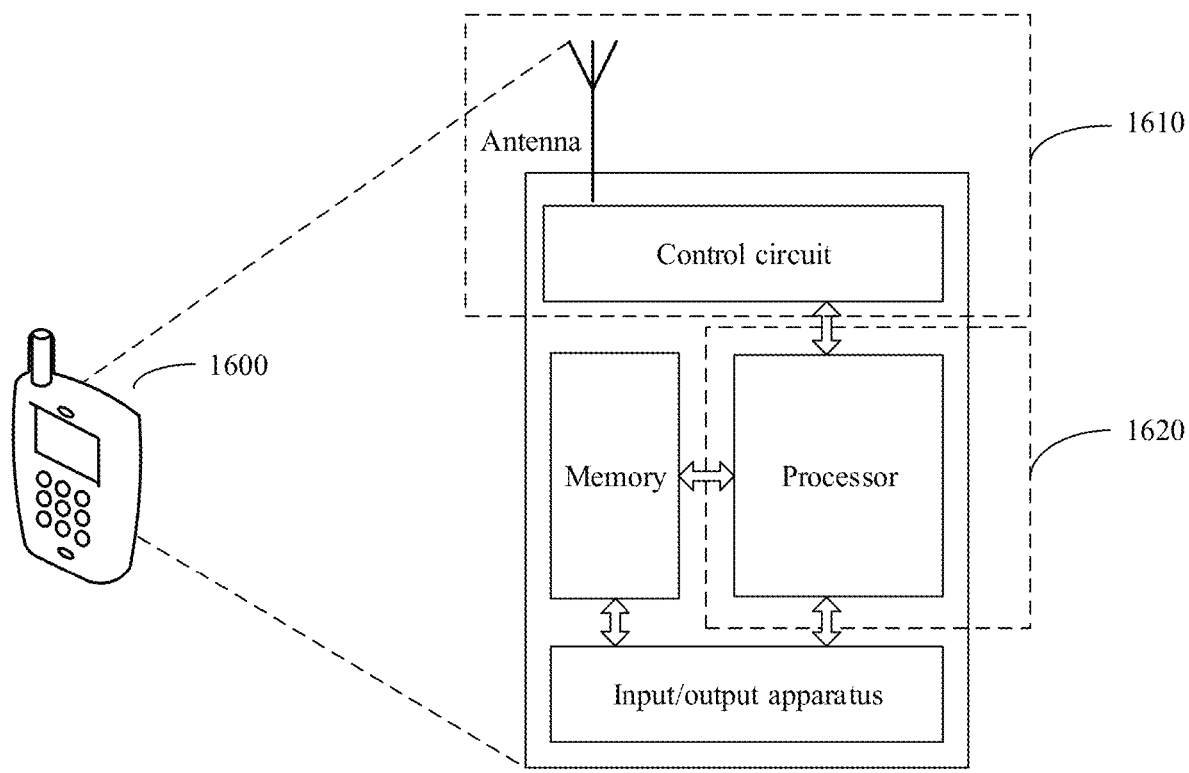
FIG. 16 is a schematic diagram of a structure of a terminal device according to this application.

FIG. 16 is a schematic diagram of a structure of a terminal device 1600 according to this application. The terminal device 1600 may perform the actions performed by the terminal device in the foregoing method embodiments.

For ease of description, FIG. 16 shows only main components of the terminal device. As shown in FIG. 16, the terminal device 1600 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing actions described in the foregoing embodiment of the indication method for transmitting a precoding matrix. The memory is mainly configured to store the software program and data, for example, store a codebook described in the foregoing embodiment. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, for example, a touchscreen, a display, or a keyboard, is mainly configured to receive data input by a user, and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in a form of an electromagnetic wave through the antenna. When data is sent to the terminal device, the radio frequency circuit receives the radio frequency signal through the antenna, converts the radio frequency signal into the baseband signal, and outputs the baseband signal to the processor. The processor converts the baseband signal into data and processes the data.

A person skilled in the art may understand that, for ease of description, FIG. 16 shows only one memory and one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to control the entire terminal device, execute a software program, and process data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be considered as a transceiver unit 1610 of the terminal device 1600, and the processor having a processing function may be considered as a processing unit 1620 of the terminal device 1600. As shown in FIG. 16, the terminal device 1600 includes the transceiver unit 1610 and the processing unit 1620. The transceiver unit 1610 may also be referred to as a transceiver, a transceiver machine, a transceiver apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. That is, the transceiver unit includes the receiving unit and the sending unit. For example, the receiving unit may also be referred to as a receiver, a receive machine, or a receiving circuit. The sending unit may be referred to as a transmitter, a transmit machine, or a transmitting circuit.

Figure 17:
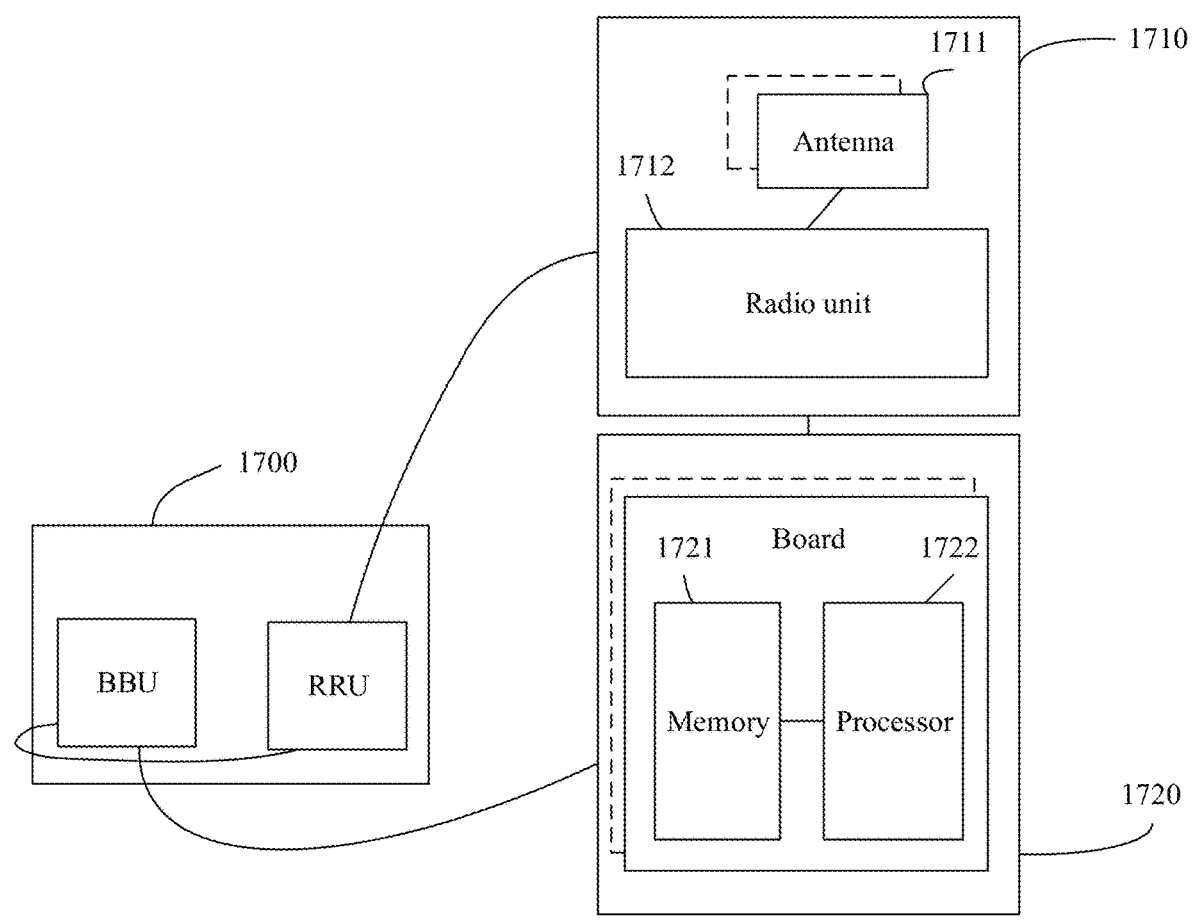
FIG. 17 is a schematic diagram of a structure of a network device according to an embodiment of this application.

FIG. 17 is a schematic diagram of a structure of a network device 1700 according to an embodiment of this application. The network device 1700 may be configured to implement functions of the access network device (for example, the first access network device or the second access network device) in the foregoing method. The network device 1700 includes one or more radio units such as a remote radio unit (RRU) 1710 and one or more baseband units (BBU) (which may also be referred to as a digital unit, DU) 1720. The RRU 1710 may be referred to as a transceiver unit, a transceiver, a transceiver circuit, a transceiver, or the like, and may include at least one antenna 1711 and a radio unit 1712. The RRU 1710 part is mainly configured to: send and receive a radio frequency signal and perform conversion between a radio frequency signal and a baseband signal, for example, is configured to send the signaling message in the foregoing embodiments to a terminal device. The BBU 1720 is mainly configured to perform baseband processing, control a base station, and so on. The RRU 1710 and the BBU 1720 may be physically deployed together, or may be physically separated, that is, a distributed base station.

The BBU 1720 is a control center of the base station, may also be referred to as a processing unit, and is mainly configured to implement a baseband processing function, for example, channel coding, multiplexing, modulation, and spreading. For example, the BBU (the processing unit) 1720 may be configured to control the access network device to perform an operation procedure related to the access network device in the foregoing method embodiments.

In an example, the BBU 1720 may include one or more boards, and a plurality of boards may jointly support a radio access network (such as an LTE system or a 5G system) in a single access standard, or may separately support radio access networks in different access standards. The BBU 1720 further includes a memory 1721 and a processor 1722. The memory 1721 is configured to store necessary instructions and data. The processor 1722 is configured to control the access network device for necessary actions, for example, configured to control the access network device for an operation procedure related to the access network device in the foregoing method embodiments. The memory 1721 and the processor 1722 may serve one or more boards. In other words, a memory and a processor may be deployed on each board. Alternatively, the plurality of boards may share a same memory and processor. In addition, a necessary circuit may further be deployed on each board.

In a possible implementation, with development of a system-on-chip (SoC) technology, all or some functions of the part 1720 and the part 1710 may be implemented using the SoC technology, for example, implemented using a base station function chip. The base station function chip integrates components such as a processor, a memory, and an antenna port. A program of a base station—related function is stored in the memory. The processor executes the program to implement the base station—related function. Optionally, the base station function chip can also read an external memory of the chip, to implement a related function of the base station.

It should be understood that the structure of the network device shown in FIG. 17 is merely a possible form, and should not constitute any limitation on embodiments of this application. This application does not exclude a possibility that a base station structure of another form may appear in the future.

According to the methods provided in embodiments of this application, an embodiment of this application further provides a communication system. The communication system includes the foregoing first access network device, second access network device, and terminal device.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example and not limitative description, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When the software is used to implement embodiments, the foregoing embodiments may be implemented completely or partially in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, the steps performed by the first access network device, the steps performed by the second access network device, or the steps performed by the terminal device in any one of the foregoing embodiments are implemented.

An embodiment of this application further provides a computer program product. When the computer program product is executed by a computer, the steps performed by the first access network device, the steps performed by the second access network device, or the steps performed by the terminal device in any one of the foregoing embodiments are implemented.

An embodiment of this application further provides a system chip. The system chip includes a communication unit and a processing unit. The processing unit may be, for example, a processor. The communication unit may be, for example, an input/output interface, a pin, or a circuit. The processing unit may execute computer instructions, so that the chip in the communication apparatus performs the steps performed by the first access network device, the steps performed by the second access network device, or the steps performed by the terminal device provided in the foregoing embodiments of this application.

Optionally, the computer instructions are stored in a storage unit.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

It should be understood that in the foregoing embodiments, terms such as "first" and "second" are merely intended to distinguish different objects, and should not constitute any limitation on this application, for example, distinguish between different access network devices and different unlicensed channels.

It should be further understood that the term "and/or" describes an association relationship between associated objects and represents that three relationships may exist. For example, A and/or B may represent the following three cases: only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first access network device, comprising:
at least one processor; and
one or more memories including computer instructions that, when executed by the at least one processor, cause the first access network device to perform operations comprising:
receiving a handover request from a second access network device, wherein the handover request comprises a request to hand over a terminal device from the second access network device to the first access network device;
in response to the handover request, sending a handover response to the second access network device;
starting a timer corresponding to the terminal device when the handover response is sent;
receiving a random access request sent by a terminal device;
performing unsuccessful listen before talk (LBT) for channel detection on an unlicensed channel, wherein performing unsuccessful LBT comprises: failing to send msg2 to the terminal device within a period of time defined by the timer; and
sending first indication information to a second access network device, wherein the first indication information indicates that the first access network device performs unsuccessful LBT for channel detection on the unlicensed channel.

2. The first access network device according to claim 1, wherein the operations further comprise:
before the performing unsuccessful listen before talk (LBT):
receiving indication information from the second access network device, wherein the indication information indicates the first access network device to start a timer corresponding to the terminal device, and the timer is used by the first access network device to identify the terminal device; and
starting the timer based on the indication information from the second access network device.

3. The first access network device according to claim 1, wherein the first indication information comprises at least one of an identifier of the terminal device, an identifier of a cell on which unsuccessful LBT is performed, or a probability of unsuccessful LBT.

4. The first access network device according to claim 1, wherein the random access request is sent by using a common random access resource.

5. The first access network device according to claim 1, wherein the random access request is sent by using a dedicated preamble.

6. A second access network device, comprising:
at least one processor; and
one or more memories including computer instructions that, when executed by the at least one processor, cause the second access network device to perform operations comprising:
sending a handover request to a first access network device, wherein the handover request comprises a request to hand over a terminal device from the second access network device to the first access network device;
in response to the handover request, receiving a handover response from the first access network device, wherein the handover response starts a timer corresponding to the terminal device when the handover response is sent;
receiving first indication information sent by a first access network device, wherein the first indication information indicates that the first access network device performs unsuccessful listen before talk (LBT) for channel detection on an unlicensed channel, wherein performing unsuccessful LBT comprises: failing to send msg2 to the terminal device within a period of time defined by the timer; and
determining based on the first indication information, a cause for a mobility problem arising from handover of a terminal device from the second access network device to the first access network device.

7. The second access network device according to claim 6, wherein the operations further comprise:
before the receiving the first indication information:
sending indication information to the first access network device, wherein the indication information indicates the first access network device to start a timer corresponding to the terminal device, and the timer is used by the first access network device to identify the terminal device.

8. The second access network device according to claim 6, wherein the first indication information comprises at least one of an identifier of the terminal device, an identifier of a cell on which unsuccessful LBT is performed, and a probability of unsuccessful LBT.

9. The second access network device according to claim 6, wherein the cause is determined to be unsuccessful LBT by the first access network device.

10. A terminal device, comprising:
at least one processor; and
one or more memories including computer instructions that, when executed by the at least one processor, cause the terminal device to perform operations comprising:
performing unsuccessful listen before talk (LBT) for channel detection on a first unlicensed channel;
performing successful LBT for channel detection on a second unlicensed channel;
sending on the second unlicensed channel, a request message to a first access network device; and
sending a successful handover report to the first access network device, wherein the successful handover report indicates that the terminal device performs unsuccessful LBT for channel detection on the first unlicensed channel before performing channel detection on the second unlicensed channel and performing successful LBT, and wherein the successful handover report indicates that the terminal device is successfully handed over to the first access network device, and the successful handover report comprises a period of time from a moment at which the terminal device starts to perform channel detection on the first unlicensed channel to a moment at which the terminal device performs successful LBT on the second unlicensed channel.

11. The terminal device according to claim 10, wherein the successful handover report further comprises at least one of the following:
- information about a moment at which the terminal device performs unsuccessful LBT on the first unlicensed channel;
- a period of time from a moment at which the terminal device receives a handover command to a moment at which the terminal device starts to check LBT on the first unlicensed channel;
- a period of time from a moment at which the terminal device receives a handover command to a moment at which the terminal device performs unsuccessful LBT on the first unlicensed channel;
- a period of time from a moment at which the terminal device starts to check LBT on the first unlicensed channel to a moment at which the terminal device performs unsuccessful LBT;
- a period of time from a moment at which the terminal device performs unsuccessful LBT to a moment at which the terminal device performs successful LBT;
- a quantity of times of performing unsuccessful LBT during a period of time from a moment at which the terminal device starts to perform channel detection on the first unlicensed channel to a moment at which the terminal device performs successful LBT on the second unlicensed channel; or
- channel occupation information.

12. The terminal device according to claim 10, wherein the successful handover report comprises at least one of an identifier of the terminal device, an identifier of a cell on which unsuccessful LBT is performed, and a probability of unsuccessful LBT.

13. The terminal device according to claim 10, wherein the request message comprises a message 1 or a message 3 in a random access procedure.

14. The terminal device according to claim 10, wherein the successful handover report is sent by using a radio resource control (RRC) message.

15. The terminal device according to claim 14, wherein the RRC message comprises a RRC reconfiguration complete message.

16. The terminal device according to claim 10, wherein the operations further comprises:
- receiving a handover command from a second access network device.

17. The terminal device according to claim 10, wherein the operations further comprises:
- sending a measurement report to a second access network device.

\* \* \* \* \*